US012326237B2

(12) United States Patent
Takeuchi

(10) Patent No.: US 12,326,237 B2
(45) Date of Patent: Jun. 10, 2025

(54) ILLUMINATION APPARATUS

(71) Applicant: KYOCERA Corporation, Kyoto (JP)

(72) Inventor: Eri Takeuchi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/572,233

(22) PCT Filed: Jun. 23, 2022

(86) PCT No.: PCT/JP2022/025147
§ 371 (c)(1),
(2) Date: Dec. 20, 2023

(87) PCT Pub. No.: WO2023/276854
PCT Pub. Date: Jan. 5, 2023

(65) Prior Publication Data
US 2024/0288148 A1    Aug. 29, 2024

(30) Foreign Application Priority Data

Jun. 30, 2021 (JP) .................................. 2021-108719
Feb. 21, 2022 (WO) .................. PCT/JP2022/006866

(51) Int. Cl.
*F21V 11/08* (2006.01)
*F21V 5/00* (2018.01)
*F21V 5/04* (2006.01)

(52) U.S. Cl.
CPC .............. *F21V 11/08* (2013.01); *F21V 5/008* (2013.01); *F21V 5/048* (2013.01)

(58) Field of Classification Search
CPC ........... F21V 11/08; F21V 11/10; F21V 11/12
See application file for complete search history.

(56) References Cited

U.S. PATENT DOCUMENTS

| | | |
|---|---|---|
| 10,247,384 B1 * | 4/2019 | Feinbloom .............. F21V 17/12 |
| 10,415,799 B1 | 9/2019 | Grove et al. |
| 2009/0003400 A1 | 1/2009 | Nagahama et al. |
| 2010/0033959 A1 | 2/2010 | Alessio |
| 2013/0063951 A1 | 3/2013 | Beier et al. |

(Continued)

FOREIGN PATENT DOCUMENTS

| | | |
|---|---|---|
| EP | 3540298 A1 | 9/2019 |
| HR | P20180085 A2 | 7/2019 |

(Continued)

*Primary Examiner* — Sean P Gramling
(74) *Attorney, Agent, or Firm* — Volpe Koenig

(57) ABSTRACT

An illumination apparatus includes a housing, a first light source, a first lens optical system, and a shield. The housing includes a first opening. The first lens optical system includes at least one first lens between a first emission portion of the first light source and the first opening in the housing on a first light path. The first lens optical system forms an image of the first light from the first emission portion on an imaginary image plane adjacent to the first opening and causes the first light to be emitted through the first opening. The shield includes a second opening to allow passage of the first light. The first light is partially incident on the shield. Two outermost beams of the first light on the first emission portion form a smaller angle after passing through the second opening in the shield than before passing through the second opening.

18 Claims, 21 Drawing Sheets

(56) References Cited

U.S. PATENT DOCUMENTS

2019/0072240 A1    3/2019   Dodo et al.
2021/0003263 A1    1/2021   Taudt et al.

FOREIGN PATENT DOCUMENTS

| | | |
|---|---|---|
| JP | 03-043903 A | 2/1991 |
| JP | 2017-147025 A | 8/2017 |
| JP | 2021-512466 A | 5/2021 |
| WO | 2007/105647 A1 | 9/2007 |

\* cited by examiner

ILLUMINATION APPARATUS

CROSS-REFERENCE TO RELATED APPLICATION

This application claims priority to Japanese Patent Application No. 2021-108719 filed on Jun. 30, 2021 and International Application No. PCT/JP2022/006866 filed on Feb. 21, 2022, the entire disclosure of which is incorporated herein by reference.

FIELD

The present disclosure relates to an illumination apparatus.

BACKGROUND

A known illumination apparatus emits light with a light source and reflects the light with an ellipsoidal mirror to illuminate an illumination space (e.g., Patent Literatures 1 and 2).

CITATION LIST

Patent Literature

Patent Literature 1: Japanese Unexamined Patent Application Publication No. 3-43903
Patent Literature 2: Japanese Unexamined Patent Application Publication No. 2017-147025

SUMMARY

One or more aspects of the present disclosure are directed to an illumination apparatus.

In one embodiment, an illumination apparatus includes a housing, a first light source, a first lens optical system, and at least one shield. The housing includes a first opening. The first light source includes a first emission portion to emit first light into an internal space of the housing. The first lens optical system includes at least one first lens between the first emission portion and the first opening in the housing on a path of the first light. The first lens optical system forms an image of the first light from the first emission portion on an imaginary image plane adjacent to the first opening and causes the first light to be emitted through the first opening. The at least one shield is located on the path of the first light and includes a second opening to allow passage of the first light. The first light is partially incident on the at least one shield. Two outermost beams of the first light on the first emission portion form a smaller angle after passing through the second opening in the at least one shield than before passing through the second opening.

DESCRIPTION OF EMBODIMENTS

First Embodiment

Figure 1:
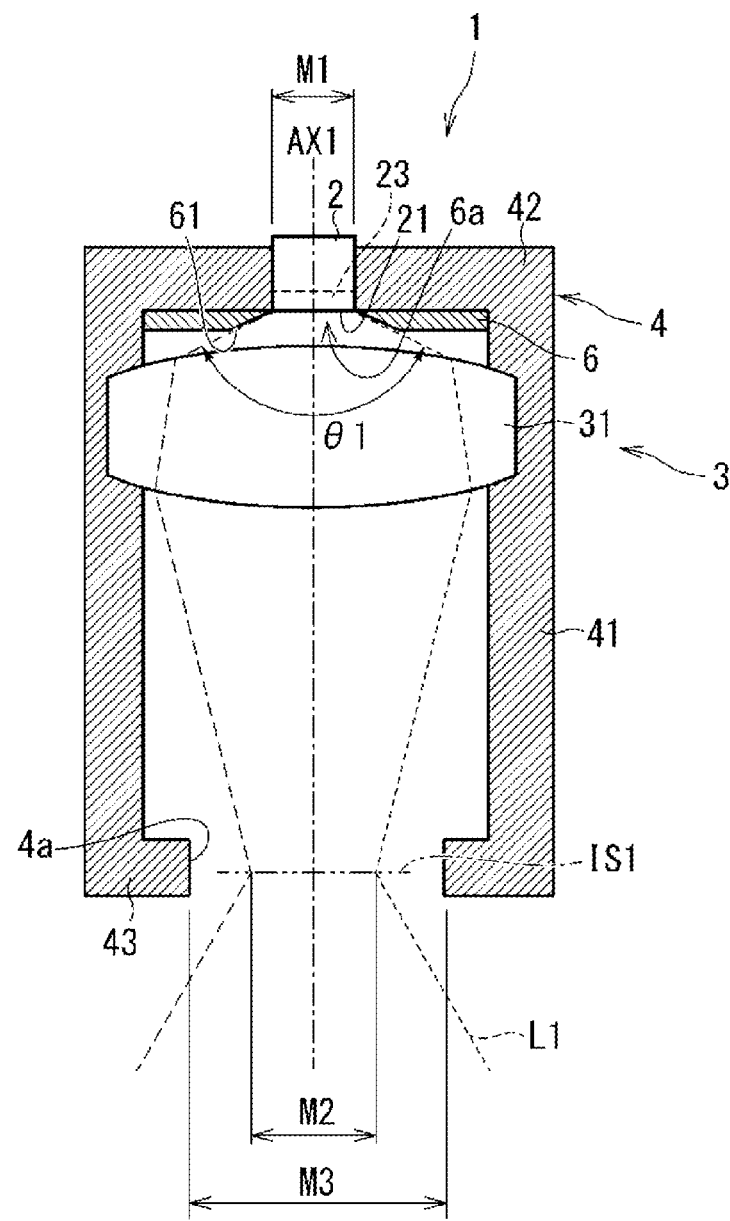
FIG. 1 is a schematic cross-sectional view of an illumination apparatus with an example structure according to a first embodiment.

FIG. 1 is a schematic cross-sectional view of an illumination apparatus 1 with an example structure according to a first embodiment. The illumination apparatus 1 emits first light L1 into an illumination space S1. The illumination apparatus 1 is located on, for example, the ceiling in the illumination space S1.

As illustrated in FIG. 1, the illumination apparatus 1 includes a first light source 2, a first lens optical system 3, a housing 4, and a first shield 6.

The first light source 2 includes a first emission portion (e.g., an emission surface) 21 for emitting the first light L1 into the internal space of the housing 4. The first light L1 is, for example, visible light. The first light source 2 may include, for example, a semiconductor laser element such as a laser diode (LD), or a light emitter such as a light-emitting diode (LED), a vertical-cavity surface-emitting laser (VCSEL), or a superluminescent diode (SLD). The first emission portion 21 of the first light source 2 may be an output end of the light emitter.

In some embodiments, the first light source 2 may include a light guide such as a fiber or a rod lens, in addition to the light emitter. The fiber includes a linear core and a cladding. The cladding covering the core has a lower refractive index than the core. The first light L1 can pass through the core while being totally internally reflected from the interface between the core and the cladding. The rod lens is, for example, columnar. The first light L1 can pass through the rod lens while being totally internally reflected from the side surface of the rod lens.

The light guide has an input end corresponding to a first end face of the fiber or of the rod lens in the longitudinal direction. The light guide has an output end corresponding to a second end face of the fiber or of the rod lens opposite to the first end face.

The first light L1 from the light emitter enters the light guide through the input end, travels through the light guide, and is emitted from the light guide through the output end into the internal space of the housing 4. In this case, the first emission portion 21 of the first light source 2 corresponds to the output end of the light guide.

The first emission portion 21 may include a wavelength converter 23. The first light L1 may be fluorescence emitted from the wavelength converter 23. The wavelength converter 23 may contain, for example, $BaMgAl_{10}O_{17}:Eu$, $(Sr, Ca, Ba)_{10}(PO_4)_6Cl_2:Eu$, or $(Sr, Ba)_{10}(PO_4)_6Cl_2:Eu$ as a wavelength conversion material that converts excitation light to blue light. The wavelength converter 23 may contain, for example, $(Sr, Ba, Ca)_5(PO_4)_3Cl:Eu$ or $Sr_4Al_{14}O_{25}:Eu$ as a wavelength conversion material that converts excitation light to blue green light. The wavelength converter 23 may contain, for example, $SrSi_2(O, Cl)_2N_2:Eu$, $(Sr, Ba, Mg)_2SiO_4:Eu^{2+}$, $ZnS:Cu, Al$, or $Zn_2SiO_4:Mn$ as a wavelength conversion material that converts excitation light to green light. The wavelength converter 23 may contain, for example, $Y_2O_2S:Eu$, $Y_2O_3:Eu$, $SrCaClAlSiN_3:Eu^{2+}$, $CaAlSiN_3:Eu$, or $CaAlSi(ON)_3:Eu$ as a wavelength conversion material that converts excitation light to red light. The wavelength converter 23 may contain $3Ga_5O_{12}:Cr$ as a wavelength conversion material that converts excitation light to light with a wavelength in the near-infrared region.

In this case, the first light source 2 emits excitation light. The excitation light may be, for example, violet light with a peak near 405 nm or blue light with a peak near 450 nm. The illumination apparatus 1 has higher color rendering when the excitation light has a peak between 380 and 415 nm with the wavelength converter 23 including RGB phosphors.

The first light L1 from the first emission portion 21 of the first light source 2 diverges while traveling. In other words, the first light L1 has a size larger at a larger distance from the first light source 2 in a cross section perpendicular to an optical axis AX1 of the first light source 2. The first light L1 may have a size defined by a contour indicating a light intensity of $1/e^2$ of the peak value in the light intensity distribution of the first light L1 in a cross section perpendicular to the optical axis AX1. The number e is referred to as an Euler's number. In other words, the first light L1 in FIG. 1 includes two outermost beams having a light intensity of $1/e^2$ of the peak value in the light intensity distribution in a cross section perpendicular to the optical axis AX1. The light outside the area surrounded by the above contour (two outermost beams) may be noise.

The first shield 6 is located on the path of the first light L1 inside the housing 4. In the example in FIG. 1, the first shield 6 is between the first emission portion 21 and the first lens optical system 3. More specifically, for example, the first shield 6 is located immediately downstream from the first emission portion 21. The first shield 6 is, for example, a plate including an opening 6a (corresponding to a second opening) in its center. The opening 6a extends through the first shield 6 in the optical axis direction along the optical axis AX1.

Beams of the first light L1 emitted from the first emission portion 21 with relatively small divergence angles travel straight through the opening 6a in the first shield 6 and enter the first lens optical system 3.

Beams of the first light L1 emitted from the first emission portion 21 with relatively large divergence angles are incident on an opening surface 61 defining the opening 6a in the first shield 6.

In the example in FIG. 1, the opening surface 61 defining the opening 6a in the first shield 6 is inclined away from the optical axis AX1 of the first light L1 frontward in the traveling direction of the first light L1. In other words, the opening surface 61 is inclined away from the optical axis AX1 at a smaller distance from the first lens optical system 3 along the path of the first light L1. The opening surface 61 may be, for example, substantially in the shape of the side surface of a frustum with its height direction parallel to the optical axis direction, or may be curved. The frustum may be, for example, a conical frustum. In the example in FIG. 1, the opening surface 61 is linear in a cross section including the optical axis AX1. The opening surface 61 is at an angle of, for example, about 45 degrees with the optical axis AX1 in the cross section.

The opening surface 61 may be a reflective surface. In other words, the opening surface 61 may have a high reflectance of the first light L1. For example, the opening surface 61 may be a metal surface with a high reflectivity. The opening surface 61 may be made of, for example, a metal with a mirror finish. The opening surface 61 may have a reflectance of the first light L1 of, for example, higher than or equal to 60, 80, or 90%. The opening surface 61 may have a high reflectance for the entire wavelength range or for the peak wavelength of the first light L1. The opening surface 61 has, for example, a higher reflectance of the first light L1 than the inner wall of the housing 4.

The opening surface 61 being a reflective surface can reflect beams of the first light L1 toward the first lens optical system 3 when the beams are emitted from the first emission portion 21 at large divergence angles. In other words, the opening surface 61 is inclined at an angle to reflect the first light L1 from the first emission portion 21 toward the first lens optical system 3. This allows the first light L1 to enter the first lens optical system 3 at a higher intensity.

The opening surface 61 may be a light-absorbing surface. This reduces scattering of light in the housing 4 as compared with when the opening surface 61 is a reflective surface, thus achieving a comfortable illumination space with less glare.

The first light L1 passing through the opening 6a in the first shield 6 has a divergence angle θ1 less than a divergence angle θ0 of the first light L1 on the first emission portion 21. Conversely, the size of the opening 6a in the first shield 6 and the thickness and the position of the first shield 6 are determined to cause the divergence angle θ1 of the first light L1 passing through the opening 6a to be less than the divergence angle θ0 of the first light L1 on the first emission portion 21.

The divergence angle θ1 herein refers to, for example, the angle formed on the first emission portion 21 by the two outermost beams of the first light L1 passing through the opening 6a in a cross section including the optical axis AX1. When the first emission portion 21 of the first light source 2 includes the emission surface of an LED, the first light L1 has the divergence angle θ0 (refer also to FIG. 2) of, for example, about 180 degrees on the first emission portion 21. The first shield 6 is designed to cause the first light L1 passing through the opening 6a to have the divergence angle θ1 less than 180 degrees (e.g., about 90 degrees).

In the example in FIG. 1, the first shield 6 is fixed to the inner wall of a first member 42 of the housing 4. The first shield 6 may be made of the same material as and integral with the housing 4. In some embodiments, the first shield 6 may be made of a material different from the material of the housing 4 and may be fixed to the housing 4 with a predetermined fixing member. The first shield 6 integral with the housing 4 can transfer heat more efficiently to the housing 4, thus increasing the durability of the illumination apparatus 1.

The first lens optical system 3 is located on the path of the first light L1 from the first light source 2 in the internal space of the housing 4. The first lens optical system 3 includes a first lens 31 to focus the first light L1 from the first light source 2 onto an imaginary image plane IS1 located opposite to the first emission portion 21. In other words, the first lens optical system 3 is an optical imaging system that forms a real image of the first light source 2 on the image plane IS1. The first emission portion 21 is in a conjugate relationship with the image plane IS1. The conjugate relationship herein is not limited to its precise meaning. The image plane IS1 may be a portion on which first light L1 is focused most intensely at a position nearer the opening 4a than the first emission portion 21 (a portion on which the first light L1 has the smallest cross section perpendicular to the optical axis AX1 of the first light source 2).

As illustrated in FIG. 1, the first lens optical system 3 may simply include a single first lens 31. The first lens 31 may be a spherical biconvex lens. The first lens 31 is made of, for example, a glass material such as optical glass, a resin material such as an acrylic resin, or both.

In the example in FIG. 1, the first light source 2 includes the first emission portion 21 fixed to the housing 4 and emits the first light L1 toward the first lens optical system 3. The first light L1 passes through the first lens optical system 3 and then through the emission opening 4a (corresponding to a first opening) in the housing 4 into the illumination space S1 outside the housing 4. The emission opening 4a connects the internal space of the housing 4 with the illumination space S1 outside the housing 4.

In the example in FIG. 1, the housing 4 includes a side wall 41, the first member 42, and a second member 43. The side wall 41 is tubular (e.g., cylindrical). In the example in FIG. 1, the tubular side wall 41 has the central axis substantially aligned with the optical axis AX1 of the first light source 2. The first member 42 is located at a first peripheral edge of the side wall 41. The first member 42 is, for example, a plate with its periphery connected to the first peripheral edge of the side wall 41. The second member 43 is located at a second peripheral edge of the side wall 41 opposite to the first peripheral edge. The second member 43 is, for example, a plate with its periphery connected to the second peripheral edge of the side wall 41. The internal space of the housing 4 is defined by the side wall 41, the first member 42, and the second member 43.

In the example in FIG. 1, the first member 42 includes, in its center, a through-hole extending through the first member 42 along the central axis. The through-hole receives the first light source 2. In the example in FIG. 1, the second member 43 includes, in its center, the emission opening 4a extending through the second member 43 along the central axis. In the example in FIG. 1, the second member 43 extends from the lower end of the side wall 41 toward the optical axis AX1 to the periphery of the emission opening 4a. In other words, the emission opening 4a has a diameter smaller than the inner diameter of the side wall 41. The housing 4 with the second member 43 can thus include a smaller emission opening 4a, through which the first lens optical system 3 is less visible from outside the housing 4. This achieves a comfortable illumination space with less glare.

The first lens optical system 3 is between the first emission portion 21 of the first light source 2 and the emission opening 4a in the housing 4. The first lens optical system 3 focuses the first light L1 from the first light source 2 onto the image plane IS1. In the example in FIG. 1, the image plane IS1 is located in the emission opening 4a. In other words, the position of the first light source 2, the position of the first lens optical system 3, and the optical conditions of the first lens optical system 3 are determined to cause the image plane IS1 to be in the emission opening 4a. The first light L1 is thus focused with the highest intensity in the opening 4a, allowing the opening 4a to be smaller in the housing 4 with the second member 43. The first lens optical system 3 is thus less visible from outside the housing 4. This achieves a comfortable illumination space with less glare.

The image plane IS1 may not be located in the emission opening 4a. The image plane IS1 may be slightly shifted from the emission opening 4a in the traveling direction of the first light L1 passing through the emission opening 4a. More specifically, the image plane IS1 may be slightly shifted toward the inside of the housing 4 from the emission opening 4a or slightly shifted toward the illumination space S1 from the emission opening 4a.

In the illumination apparatus 1, the first lens optical system 3 has an imaging magnification less than or equal to a ratio (=M3/M1) of a size M3 of the emission opening 4a to a size M1 of the first light L1 on the first emission portion 21 of the first light source 2. The size M1 of the first light L1 on the first emission portion 21 corresponds to the size of the first emission portion 21. For example, the size M1 corresponds to the area of the end face of a fiber core or of a rod lens. When the first emission portion 21 is the end face of a light emitter, the size M1 of the first light L1 on the first emission portion 21 corresponds to the size of the end face of the light emitter. When the first emission portion 21 is a surface of the wavelength converter 23, the size M1 of the first light L1 on the first emission portion 21 corresponds to the size of the surface of the wavelength converter 23.

When the first light source 2 is an LD, for example, the emission diameter can be smaller than when the first light source 2 is an LED or a VCSEL. The first light L1 can thus have a smaller size M2 on the image plane IS1. This achieves a comfortable illumination space with less glare.

For the first light L1 with a circular cross section, the size M1 may be the diameter of the first light L1. For the first light L1 with a rectangular cross section, the size M1 may be the diagonal length of the first light L1. The size M1 of the first light L1 on the first emission portion 21 is, for example, about 2 to 3 mm.

The size M3 of the emission opening 4a corresponds to the area of the emission opening 4a in a cross section perpendicular to the optical axis AX1 in the emission opening 4a. For the emission opening 4a being circular or rectangular as viewed along the optical axis AX1, the emission opening 4a has a diameter or a diagonal length of, for example, about several to several tens of millimeters. The emission opening 4a may have a diameter of, for example, about 5 to 15 mm. For the emission opening 4a defined by an inclined surface, the size M3 of the emission opening 4a varies depending on the position along the optical axis AX1. In this case, the size M3 of the emission opening 4a may be, for example, the minimum value of the varying sizes.

The imaging magnification refers to the ratio of the size M2 of the first light L1 on the image plane IS1 to the size M1 of the first light L1 on the first emission portion 21 of the first light source 2.

With the imaging magnification being less than or equal to the above ratio, the size M2 of the first light L1 on the image plane IS1 is less than or equal to the size M3 of the emission opening 4a. In this structure, the first light L1 is less likely to be incident on the second member 43, and is thus less likely to be reflected or scattered from the inner surface of the tubular side wall 41 or from the second member 43. This reduces unintended reflection-scattering light leaking through the emission opening 4a.

The first lens optical system 3 may have an imaging magnification to cause the first light L1 passing through the emission opening 4a to have a smaller size than the emission opening 4a. This can further reduce reflection-scattering light.

Figure 2:
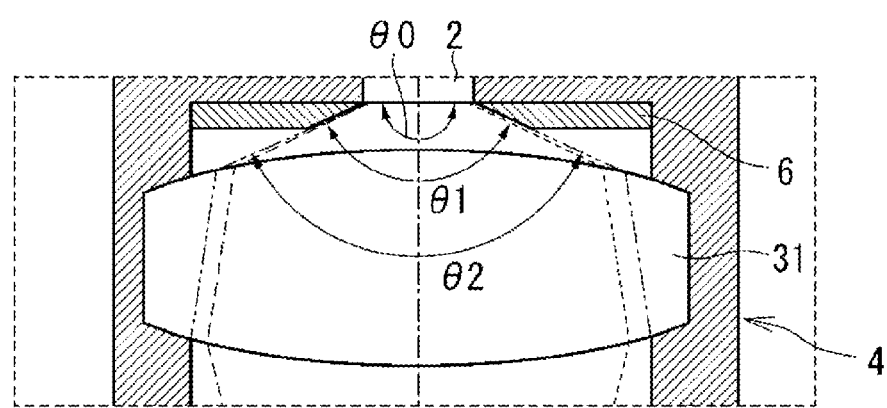
FIG. 2 is a diagram describing an angle defining the numerical aperture of a first lens optical system.

The relationship between the divergence angle θ1 and the numerical aperture of the first lens optical system 3 will now be described. In the illumination apparatus 1, the divergence angle θ1 is less than or equal to an angle θ2 defining the numerical aperture of the first lens optical system 3. The numerical aperture is the product of the sine of half the angle θ2 and the refractive index. FIG. 2 is a diagram describing the angle θ2 defining the numerical aperture of the first lens optical system 3. The angle θ2 herein refers to, for example, the angle formed by the two outermost beams of imaginary light passing through an active area of the first lens optical system 3. The active area herein refers to an area through which light passes to achieve the optical performance of the first lens optical system 3. For example, the active area of the first lens 31 is the area of the main surface of the first lens 31 excluding a predetermined peripheral width. More specifically, the active area of the first lens 31 may be, for example, an area surrounded by an inner peripheral portion (a lens holder) of the housing 4 holding the periphery of the first lens 31. The two outermost beams of the first light L1 may define, for example, the emission diameter of the first light L1. The two outermost beams of the first light L1 may define the size of the first light L1 in a cross section perpendicular to the optical axis AX1 of the first light source 2.

With the divergence angle θ1 being less than or equal to the angle θ2, the first light L1 can pass within the active area of the first lens optical system 3 after passing through the opening 6a in the first shield 6. The first light L1 is thus substantially not incident on the edge of the first lens 31, thus reducing or avoiding unintended reflection or scattering of the first light L1 from the edge.

The angle θ2 defining the numerical aperture of the first lens optical system 3 may be greater than the divergence angle θ1 of the first light L1 after the first light L1 passes through the opening 6a in the first shield 6, and may be less than the divergence angle θ0 of the first light L1 on the first emission portion 21 (before the first light L1 passes through the opening 6a in the first shield 6). This reduces or avoids unintended reflection or scattering of the first light L1 from the periphery of the first lens optical system 3 and the periphery of the emission opening 4a. The structure can thus reduce reflection-scattering light leaking into the illumination space S1, reducing unevenness (e.g., glare) of the first light L1 emitted into the illumination space S1.

As described above, in the illumination apparatus 1, the first lens optical system 3 has an imaging magnification less than or equal to the above ratio, and the divergence angle θ1 is less than or equal to the angle θ2. This reduces or avoids unintended reflection or scattering of the first light L1 from the periphery of the first lens optical system 3 and the periphery of the emission opening 4a. The structure can thus reduce reflection-scattering light leaking into the illumination space S1, reducing unevenness (e.g., glare) of the first light L1 emitted into the illumination space S1. The illumination apparatus 1 can thus emit the first light L1 with high quality into the illumination space S1.

The first light L1 may be emitted through the emission opening 4a without being incident on the housing 4. The first light L1 without being incident on the housing 4 herein is not limited to its precise meaning. For example, noise (e.g., scattered light) may be incident on the housing 4 when the two outermost beams of the first light L1 travel through the space from the first emission portion 21 to the emission opening 4a without being incident on the housing 4.

Figure 3:
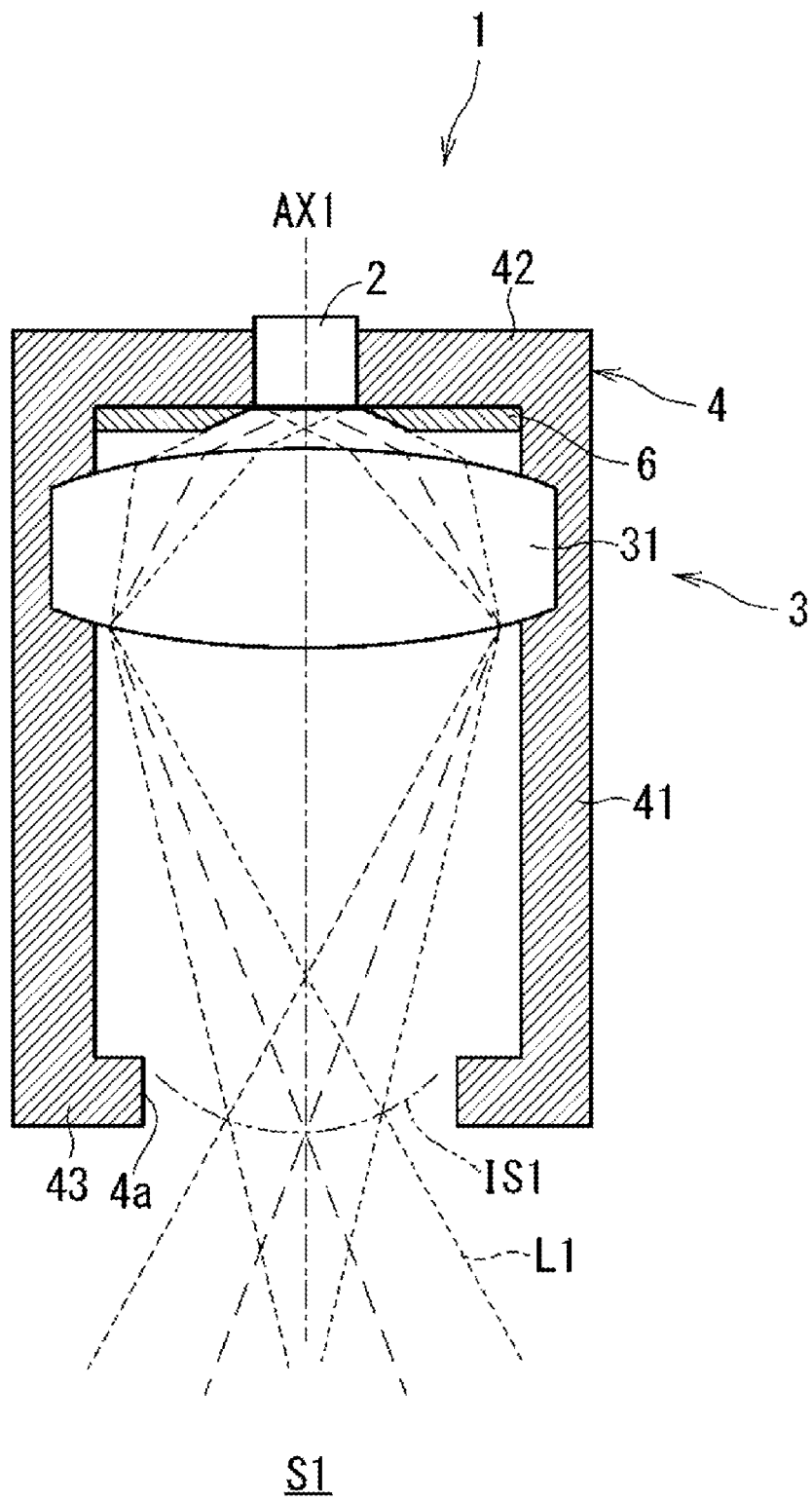
FIG. 3 is a schematic cross-sectional view of an illumination apparatus in a first implementation of the first embodiment.

FIG. 3 is a schematic cross-sectional view of the illumination apparatus 1 in a first implementation. In the example in FIG. 3, the image plane IS1 is curved. More specifically, for example, the image plane IS1 is curved and protrudes toward the illumination space S1. The first lens optical system 3 with this structure may include an inexpensive first lens 31. The illumination apparatus 1 can thus be manufactured at a lower cost. The first lens 31 may include a continuously curved surface. For example, the main surface of the first lens 31 through which the first light L1 passes may be a step-free curved surface. In other words, the first lens 31 may not be a Fresnel lens. The first lens 31 is thus less likely to scatter or reflect light, thus achieving a comfortable illumination space with less glare.

Figure 4:
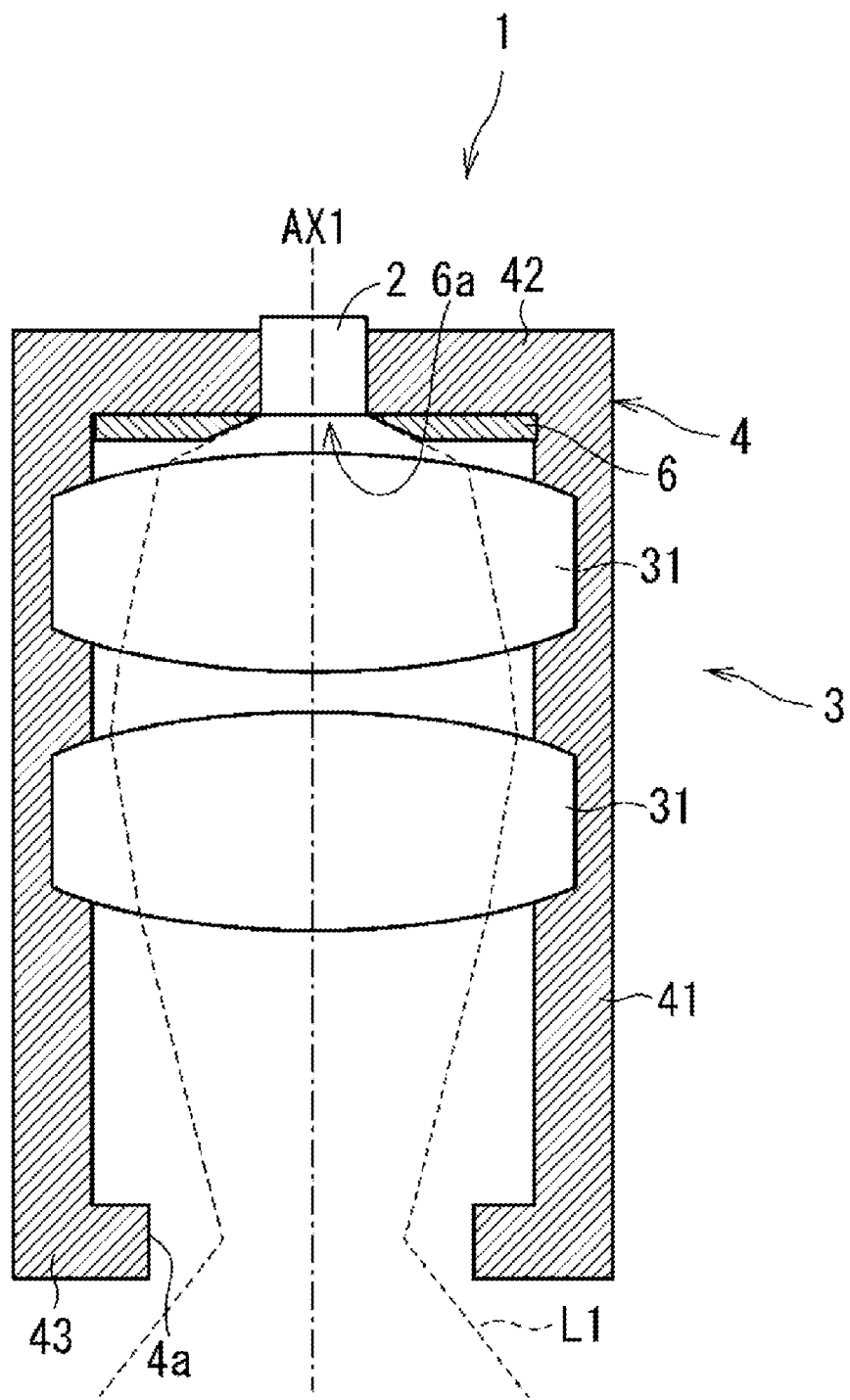
FIG. 4 is a schematic cross-sectional view of an illumination apparatus in a second implementation of the first embodiment.
Figure 5:
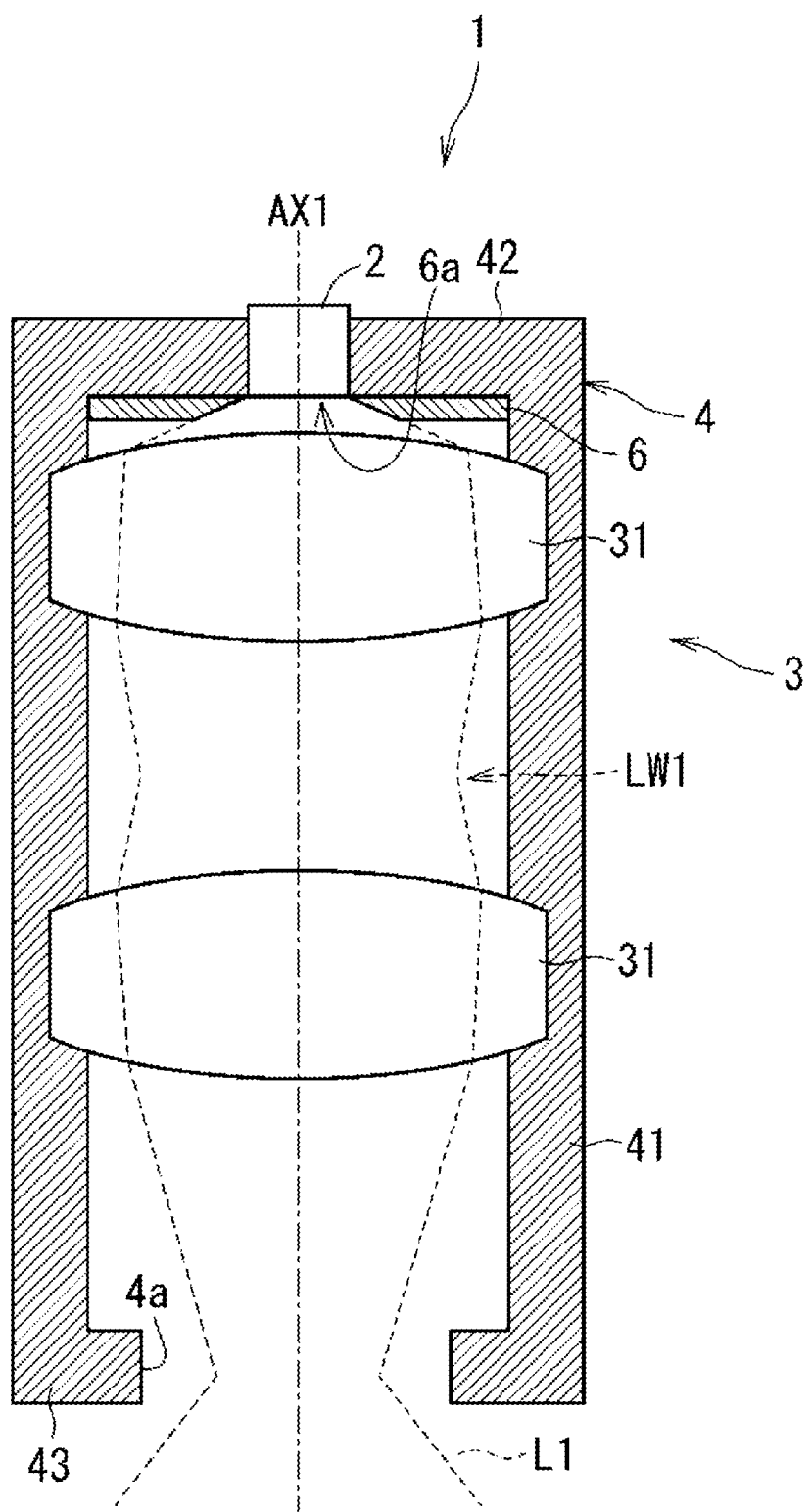
FIG. 5 is a schematic cross-sectional view of an illumination apparatus in a third implementation of the first embodiment.

FIG. 4 is a schematic cross-sectional view of the illumination apparatus 1 in a second implementation. In the example in FIG. 4, the first lens optical system 3 includes multiple first lenses 31 aligned on the path of the first light L1. The first lenses 31 may be aligned in the optical axis direction of the first light L1. Such first lenses 31 may also be referred to as compound lenses. The first lens optical system 3 including the combined first lenses 31 can easily have intended optical characteristics without including a special optical element, such as a Fresnel lens. FIG. 5 is a schematic cross-sectional view of the illumination apparatus 1 in a third implementation. The structure in the third implementation is the same as or similar to the structure in the second implementation. As illustrated in the third implementation, the first light L1 may include, between the first lenses 31, a portion (a waist LW1) with a diameter smaller than the diameter of the first light L1 passing through each first lens 31. More specifically, the minimum value of the diameter (the diameter of the waist LW1) of the first light L1 between the two adjacent first lenses 31 may be less than the minimum value of the diameter of the first light L1 in each of the two first lenses 31. In the second implementation and the third implementation, for example, the first lens optical system 3 can have a higher imaging magnification easily. The first lens optical system 3 may include, for example, three or more lenses aligned in the optical axis direction of the first light L1. The first lens optical system 3 can thus easily have intended optical characteristics.

Although the first lenses 31 are spherical lenses in the examples in FIGS. 1 to 5, the first lenses 31 may be aspherical lenses or free-form lenses.

The illumination apparatus 1 may emit the first light L1 through the emission opening 4a at an orientation angle of less than 60 degrees. This reduces visible glare caused by, for example, multiple illumination apparatuses 1 installed at regular intervals in the illumination space S1, thus improving the comfort with the illumination apparatus 1. The illumination apparatus 1 may have an orientation angle of, for example, less than 45, 30, or 15 degrees.

Figure 6:
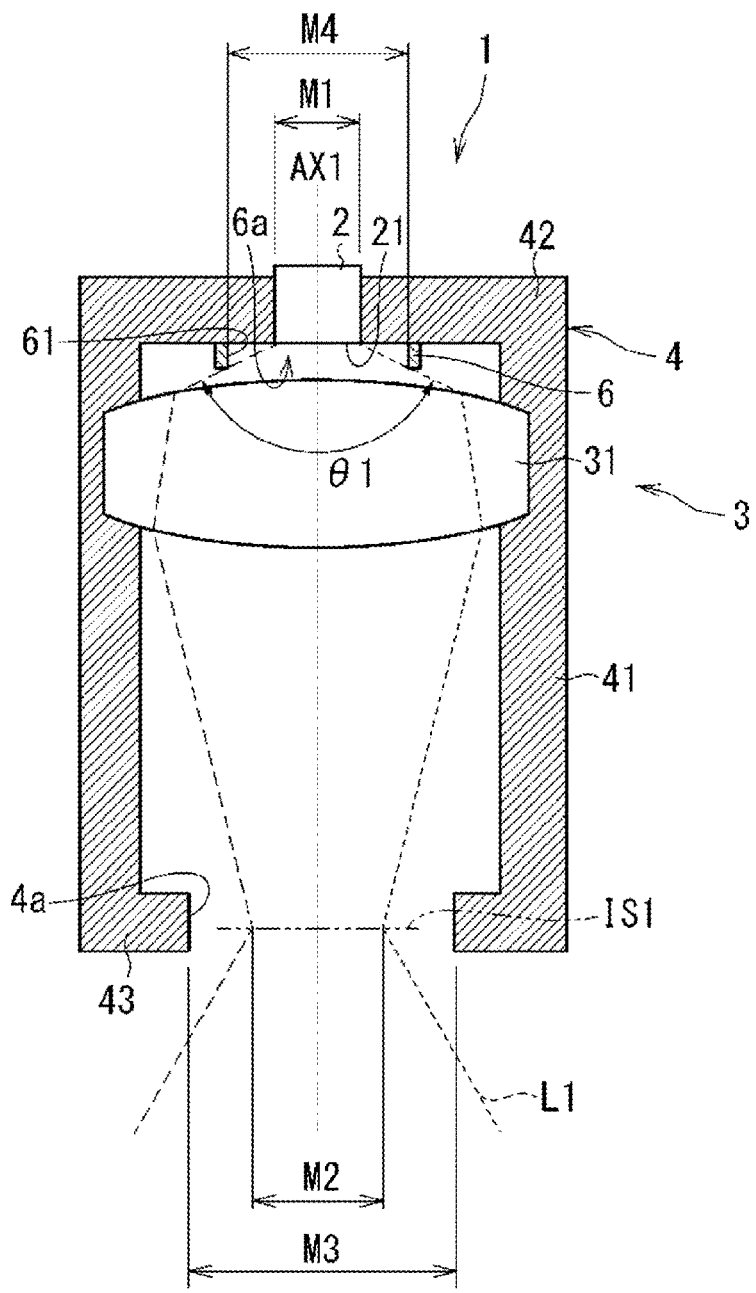
FIG. 6 is a schematic cross-sectional view of an illumination apparatus in a fourth implementation of the first embodiment.

FIG. 6 is a schematic cross-sectional view of the illumination apparatus 1 in a fourth implementation. In the example in FIG. 6, the first shield 6 includes the opening surface 61 substantially parallel to the optical axis AX1. The opening surface 61 is, for example, substantially in the shape of the side surface of a column with its height direction parallel to the optical axis direction. The first shield 6 is, for example, annular.

In the fourth implementation as well, beams of the first light L1 emitted from the first emission portion 21 with smaller divergence angles pass through the opening 6a in the first shield 6 and enter the first lens optical system 3. Beams of the first light L1 emitted from the first emission portion 21 with larger divergence angles are incident on the opening surface 61 of the first shield 6. The opening surface 61 is, for example, an absorbing surface. More specifically, the opening surface 61 has a high absorptivity of the first light L1. The opening surface 61 may have an absorptivity of, for example, higher than or equal to 60, 80, or 90%. The opening surface 61 may have a high absorptivity for the entire wavelength range or for the peak wavelength of the first light L1. For example, the opening surface 61 is formed by blackening. More specifically, for example, the blackening includes conversion coating, plating, and painting. The blackening may produce a matte surface or a glossy surface. In this case, the opening surface 61 is made of a black material, such as a black metal, a black metal oxide film, a black resin, or any combination of these.

In some embodiments, the opening surface 61 may be made of a dielectric multilayer film. The dielectric multilayer film includes, for example, multiple dielectric thin films stacked on one another. The dielectric is made of, for example, one or more of titanium dioxide ($TiO_2$), $SiO_2$, niobium pentoxide ($Nb_2O_5$), tantalum pentoxide ($Ta_2O_5$), or magnesium fluoride ($MgF_2$). The dielectric multilayer film may also be referred to as a low-reflection film or an anti-reflection film.

In the fourth implementation as well, the first light L1 passing through the opening 6a in the first shield 6 has the divergence angle θ1 less than the divergence angle of the first light L1 on the first emission portion 21.

In the fourth implementation as well, the divergence angle θ1 is less than or equal to the angle θ2 defining the numerical aperture of the first lens optical system 3. Thus, the first light L1 can pass through the active area of the first lens optical system 3 after passing through the opening 6a in the first shield 6. This reduces reflection-scattering light in the housing 4, thus reducing unevenness of the first light L1 emitted through the emission opening 4a.

Figure 7:
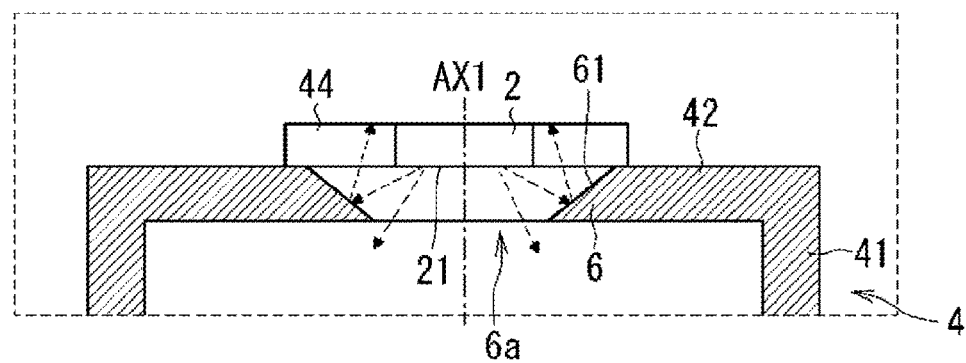
FIG. 7 is a partially schematic cross-sectional view of an illumination apparatus in a fifth implementation of the first embodiment.

FIG. 7 is a partial schematic cross-sectional view of the illumination apparatus 1 in a fifth implementation. In the example in FIG. 7, the first member 42 of the housing 4 includes an opening to allow passage of light from the first emission portion 21. The opening in the first member 42 serves as the opening 6a in the first shield 6. In other words, the first shield 6 is integral with the first member 42. In the example in FIG. 7, the housing 4 further includes a transparent connector 44 connecting the first light source 2 to the first member 42. For example, the connector 44 is annular and surrounds the optical axis AX1. The lower surface of the connector 44 includes an outer peripheral portion connected to the upper surface of the first member 42. The inner periphery of the connector 44 is connected to the first light source 2. The lower surface of the connector 44 includes an inner peripheral portion facing the opening 6a in the first shield 6. The connector 44 has a high transmittance of the first light L1. The transmittance may be, for example, higher than or equal to 60, 70, 80, or 90%.

Light emitted from the first emission portion 21 of the first light source 2 partially passes through the opening 6a in the first shield 6 and is partially reflected or scattered from the opening surface 61 of the first shield 6. As illustrated in FIG. 7, the opening surface 61 defining the opening 6a in the first shield 6 is inclined toward the optical axis AX1 of the first light L1 frontward in the traveling direction of the first light L1. The opening surface 61 with this structure directs scattered light toward the first emission portion 21, and thus reduces the likelihood that the scattered light enters the housing 4. The scattered light travels outside the housing 4 through the transparent connector 44. In other words, the opening surface 61 is inclined at an angle to direct the scattered light to the connector 44 around the first emission portion 21. This reduces scattering of light in the housing 4 as compared with when the opening surface 61 is inclined away from the optical axis AX1, thus achieving a comfortable illumination space with less glare.

Figure 8:
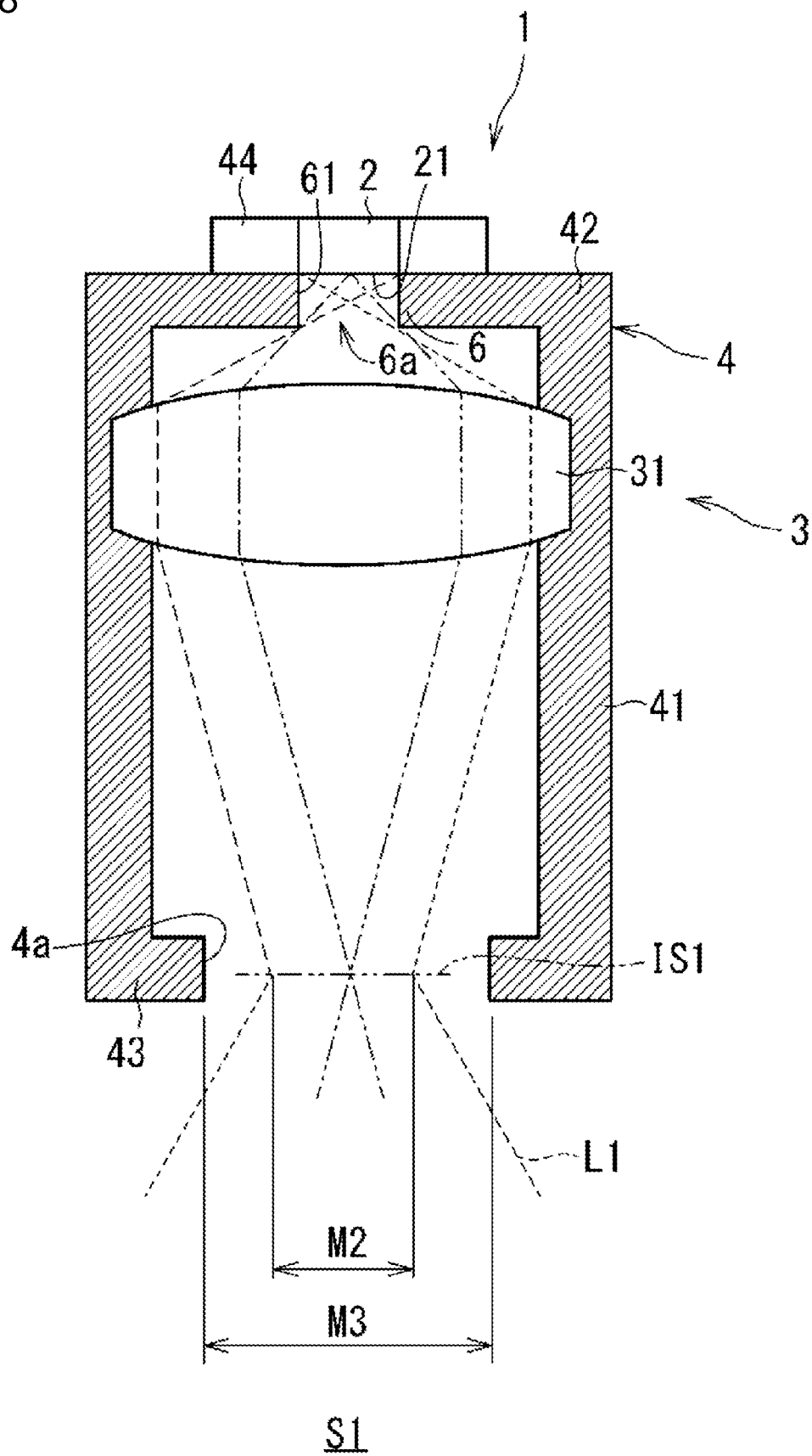
FIG. 8 is a schematic cross-sectional view of an illumination apparatus in a sixth implementation of the first embodiment.

As illustrated in FIGS. 6 and 7, the first emission portion 21 and the first shield 6 may be spaced from each other in the direction perpendicular to the optical axis AX1. In other words, the opening surface 61 defining the opening 6a in the first shield 6 may be spaced from the first emission portion 21 in the direction perpendicular to the optical axis AX1. More specifically, the first emission portion 21 may have the size M1 smaller than a size M4 (opening area) of the opening 6a in the first shield 6. Still more specifically, the first emission portion 21 may have a smaller width than the opening 6a in the first shield 6. However, the structure is not limited to this example. As illustrated in FIG. 8, the width of the output end of the first emission portion 21 may be the same as the width of the opening 6a in the first shield 6 (the diameter of the through-hole in the first member 42). This structure further reduces glare as compared with a structure in which the first emission portion 21 and the first shield 6 are spaced from each other in the direction perpendicular to the optical axis AX1. The widths being the same herein refers to the widths being substantially the same with a tolerance. More specifically, A and B being the same may include A and B deviating from each other within the tolerance.

The first emission portion 21 and the first shield 6 may partially overlap each other in the direction perpendicular to the optical axis AX1. For example, the width of the opening 6a in the first shield 6 (the diameter of the through-hole in the first member 42) may be smaller than the width of the output end of the first emission portion 21. This structure further reduces glare as compared with a structure in which the width of the output end of the first emission portion 21 is substantially the same as the width of the opening 6a in the first shield 6 (the diameter of the through-hole in the first member 42).

Figure 9:
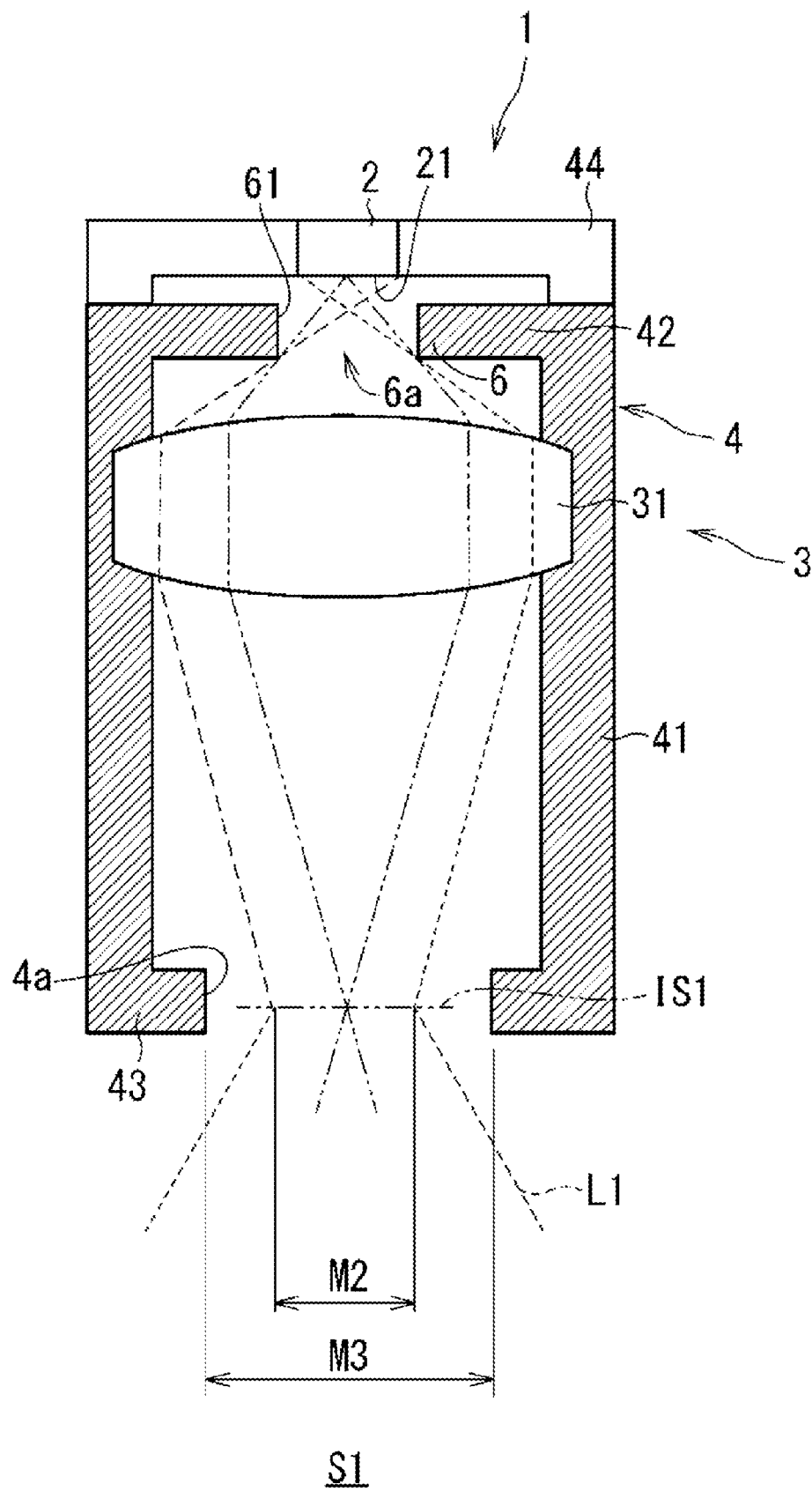
FIG. 9 is a schematic cross-sectional view of an illumination apparatus in a seventh implementation of the first embodiment.

Although the first emission portion 21 and the first shield 6 may be continuous with each other in the optical axis direction or partially overlap each other as illustrated in FIGS. 6, 7, and 8, the first emission portion 21 and the first shield 6 may be spaced from each other in the optical axis direction as illustrated in FIG. 9. In this structure, the housing 4 may further include the transparent connector 44 connecting the first light source 2 to the first member 42.

Figure 10:
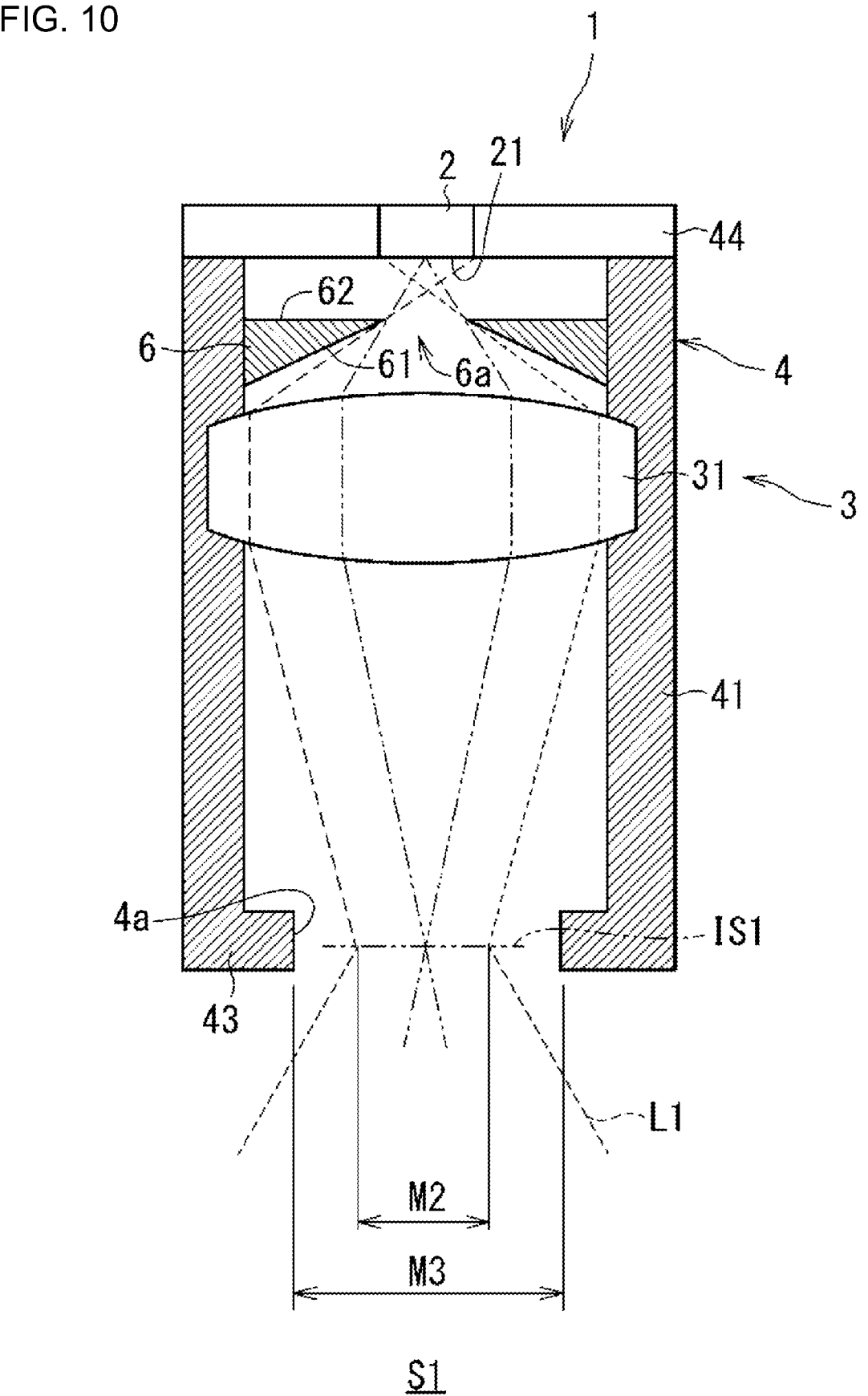
FIG. 10 is a schematic cross-sectional view of an illumination apparatus in an eighth implementation of the first embodiment.

As illustrated in FIG. 10, the opening surface 61 of the first shield 6 may be inclined away from the optical axis AX1 at a smaller distance from the first lens optical system 3 along the path of the first light L1. In this structure, beams of the first light L1 with larger divergence angles may be incident on the upper end of the opening surface 61. The upper end herein is, for example, the connection portion between the opening surface 61 and a surface 62 of the first shield 6 adjacent to the first light source 2. In this structure, beams of the first light L1 with larger divergence angles may be incident on the surface 62 of the first shield 6 adjacent to the first light source 2. In this structure, the surface 62 may be, for example, a light-absorbing surface. The light-absorbing surface may have, for example, an absorptivity of higher than or equal to 60% for the visible light region.

As illustrated in FIG. 10, the first light L1 from the first emission portion 21 may not be directly incident on the opening surface 61 of the first shield 6. More specifically, the opening surface 61 may be inclined more away from the optical axis AX1 than the outermost beams of the first light L1 passing through the opening surface 61. In other words, the acute angle formed by the opening surface 61 and the optical axis AX1 may be larger than the acute angle formed by the outermost beams and the optical axis AX1. However, the structure is not limited to this example. The opening surface 61 may be inclined to form a smaller acute angle with the optical axis AX1. This allows the first light L1 from the first emission portion 21 to be directly incident on the opening surface 61. In this structure, the opening surface 61, the surface 62, or both may be a light-absorbing surface.

In the examples in FIGS. 1, 3 to 6, and 8 to 10, the distance between the first emission portion 21 and the emission opening 4a is larger than the inner diameter of the housing 4. The distance between the first emission portion 21 and the emission opening 4a herein is, for example, the distance on the path along the optical axis AX1. With the distance being larger, the first lens optical system 3 and the emission opening 4a can have a larger spacing in between. Thus, the first lens optical system 3 can include multiple first lenses 31 with a larger spacing between the first lens 31 nearest the emission opening 4a and the emission opening 4a. The first lens optical system 3 is thus less visible from outside the housing 4, achieving a comfortable illumination space with less glare. The distance between the first lens optical system 3 and the emission opening 4a may be larger than the inner diameter of the housing 4.

Second Embodiment

Figure 11:
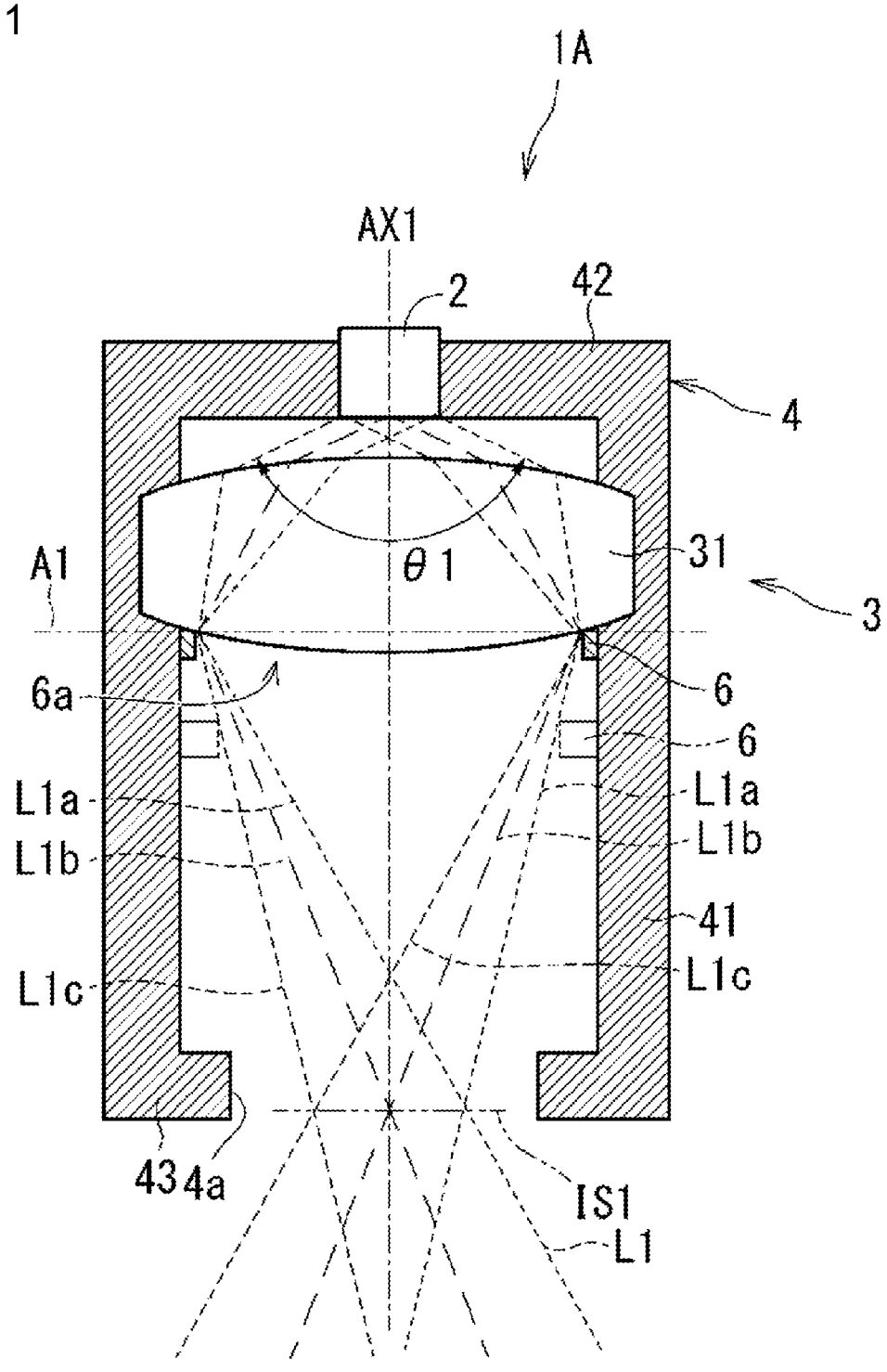
FIG. 11 is a schematic cross-sectional view of an illumination apparatus with an example structure according to a second embodiment.

FIG. 11 is a cross-sectional view of an illumination apparatus 1A with an example structure according to a second embodiment. The illumination apparatus 1A differs from the illumination apparatus 1 in the position of the first shield 6. In the illumination apparatus 1A, the first shield 6 is located downstream from the most upstream first lens 31 in the first lens optical system 3. More specifically, for example, the first shield 6 is near an aperture position of the first lens optical system 3. The aperture position herein refers to, for example, the position of the plane A1 with the highest proportion of overlap between portions of the first light L1 emitted from the points on the first emission portion 21 when the plane A1 perpendicular to the optical axis AX1 is moved in the optical axis direction. In this example, the first light L1 includes three portions referred to as a first light portion L1a, a first light portion L1b, and a first light portion L1c emitted from three points on the first emission portion 21. As illustrated in FIG. 11, the first light portion L1a, the first light portion L1b, and the first light portion L1c overlap one another on the plane A1 at the aperture position. In other words, the plane A1 illustrated in FIG. 11 has the highest proportion of overlap between the first light portions L1a to L1c with respect to the entire area of the first light L1.

In the example in FIG. 11, the first lens optical system 3 simply includes a single first lens 31 and has the aperture position immediately downstream from the first lens 31. The first shield 6 is thus located immediately downstream from the first lens 31. After the first light L1 passes through the first lens 31, a central portion of the first light L1 passes through the opening 6a in the first shield 6, and the remaining outer peripheral portion of the first light L1 is blocked by the first shield 6. Similarly to the first embodiment, the first light L1 passing through the opening 6a in the first shield 6 forms an image on the image plane IS1 and is emitted into the illumination space S1 through the emission opening 4a.

In the illumination apparatus 1A as well, the divergence angle θ1 is less than or equal to the angle θ2 defining the numerical aperture of the first lens optical system 3. The divergence angle θ1 is formed on the first emission portion 21 by the two outermost beams of the first light L1 passing through the opening 6a in the first shield 6 in a cross section including the optical axis AX1.

The first light L1 can thus pass through the opening 6a in the first shield 6 after passing through the active area of the first lens optical system 3. The illumination apparatus 1A can thus emit the first light L1 with further less unevenness through the emission opening 4a.

In the above example, the first shield 6 is near the aperture position. In this structure, the beams in the centers of the first light portions L1a to L1c emitted from the points on the first emission portion 21 pass through the center of the opening 6a in the first shield 6. Thus, the first light portions L1a to L1c emitted from the points are blocked by the first shield 6 more uniformly.

The illumination apparatus 1A can thus emit, through the emission opening 4a, the first light L1 maintaining its planar intensity distribution on the first emission portion 21. In other words, the illumination apparatus 1A can emit, into the illumination space S1, the first light L1 directly reflecting its planar distribution on the first emission portion 21. When the first light L1 has a uniform planar distribution on the first emission portion 21, for example, the illumination apparatus 1A can emit the first light L1 with a uniform planar distribution into the illumination space S1.

As described above, the first shield 6 may be at the aperture position to uniformly block the first light portions L1a to L1c emitted from the points. However, the first shield 6 may be at a position other than the aperture position to allow the first light L1 to be emitted through the emission opening 4a after passing through the active area of the first lens optical system 3. As indicated by the imaginary lines in FIG. 11, for example, the first shield 6 may be nearer the emission opening 4a than the aperture position. This structure also allows the first light L1 to be emitted through the emission opening 4a after passing through the active area of the first lens optical system 3.

When the first lens optical system 3 includes multiple first lenses 31 as illustrated in FIG. 4 or 5, the first shield 6 may be nearer the first light source 2 than the most downstream first lens 31 in the first lens optical system 3. In this structure, the first light L1 reflected or scattered from the opening surface 61 of the first shield 6 can enter the first lens 31 downstream from the first shield 6. This structure reduces reflection-scattering light emitted through the emission opening 4a as compared with a structure with no first lens 31 located downstream from the first shield 6.

Although the housing 4 includes the single first shield 6 inside in the first and second embodiments, the housing 4 may include two first shields 6. More specifically, one of the first shields 6 (refer to FIG. 1) may be between the first emission portion 21 and the first lens optical system 3, and the other first shield 6 (refer to FIG. 11) may be at, for example, the aperture position of the first lens optical system 3.

Third Embodiment

In the present embodiment, the first light L1 can be partially reflected or scattered from the first shield 6. Such reflected or scattered light can deviate from the path of the first light L1 that forms an image on the image plane IS1 and can leak through the emission opening 4a without forming an image on the image plane IS1. This can cause unevenness of the first light L1. The first light L1 reflected or scattered inside the housing 4 is hereafter also referred to as reflection-scattering light L11. The reflection-scattering light L11 may be a part of the first light L1 deviating from the path of the first light L1 that forms an image on the image plane IS1, and may be either reflected light or scattered light.

In the third embodiment, such unevenness of the first light L1 emitted into the illumination space S1 may be further reduced.

Figure 12:
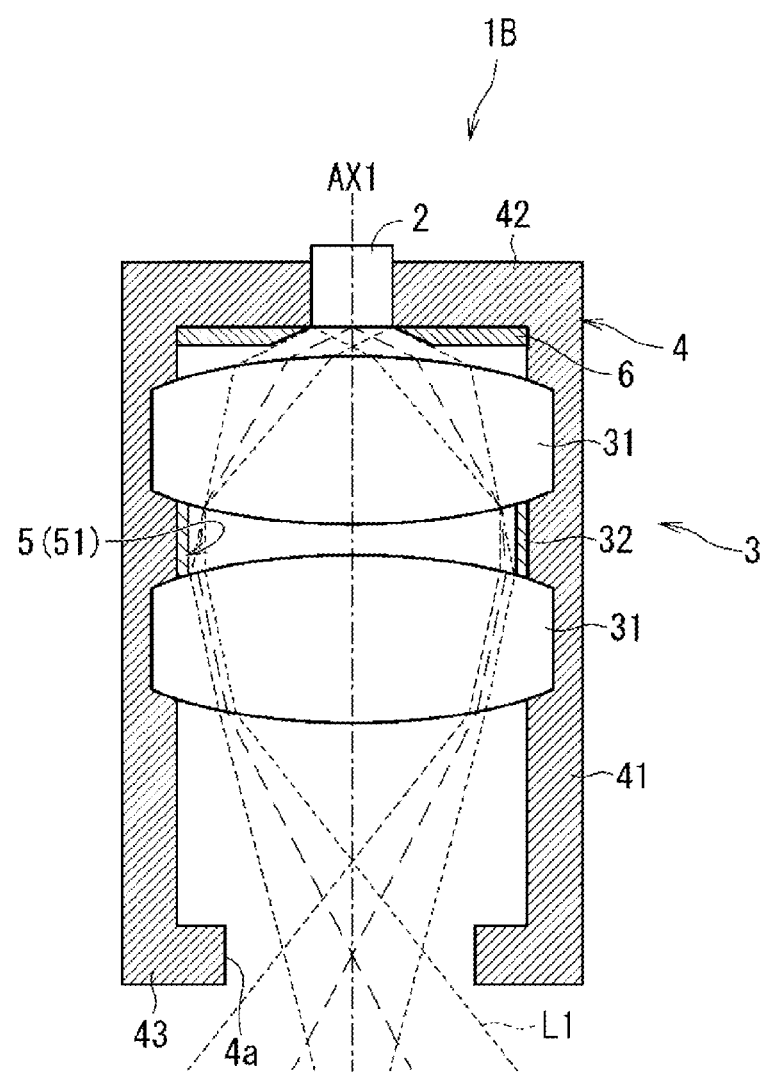
FIG. 12 is a schematic cross-sectional view of an illumination apparatus with an example structure according to a third embodiment.

FIG. 12 is a schematic cross-sectional view of an illumination apparatus 1B with an example structure according to the third embodiment. The illumination apparatus 1B differs from the illumination apparatus 1 in that the illumination apparatus 1B includes a light reducer 5. The light reducer 5 is inside the housing 4. The light reducer 5 is located to reduce the reflection-scattering light L11 to be emitted through the emission opening 4a.

The first lens optical system 3 in the illumination apparatus 1B includes multiple first lenses 31 and one or more spacers 32. In the example in FIG. 12, the first lens optical system 3 includes two first lenses 31 and one spacer 32. The spacer 32 defines the spacing between the two first lenses 31. The spacer 32 is between the two adjacent first lenses 31 and is in contact with the two first lenses 31. Thus, the spacing between the two first lenses 31 is equal to the thickness of the spacer 32 (the thickness along the optical axis AX1). The spacer 32 is, for example, annular and surrounds the optical axis AX1.

In the example in FIG. 12, the light reducer 5 is located on the inner wall of the spacer 32 and exposed in the internal space of the housing 4. The light reducer 5 includes, for example, a reflection reducer 51. The reflection reducer 51 may include an absorbing film with a high absorptivity of the first light L1. The absorptivity may be higher than or equal to, for example, 60, 80, or 90%. The reflection reducer 51 may have a high absorptivity for the entire wavelength range or for the peak wavelength of the first light L1. The reflection reducer 51 has a higher absorptivity of the first light L1 than the spacer 32.

The reflection reducer 51 is formed by, for example, blackening the inner wall of the spacer 32. More specifically, for example, the reflection reducer 51 is formed on the inner wall of the spacer 32 by blackening including conversion coating, plating, and painting. The blackening may produce a matte surface or a glossy surface. In this case, the reflection reducer 51 is made of a black material, such as a black metal, a black metal oxide film, a black resin, or any combination of these.

In some embodiments, the reflection reducer 51 may include a dielectric multilayer film. The dielectric multilayer film includes, for example, multiple dielectric thin films stacked on one another. The dielectric is made of, for example, one or more of $TiO_2$, $SiO_2$, $Nb_2O_5$, $Ta_2O_5$, or $MgF_2$. The dielectric multilayer film may also be referred to as a low-reflection film or an anti-reflection film.

The reflection reducer 51 may be formed directly on the inner wall of the spacer 32, or may be formed on a predetermined film substrate that is then fixed to the inner wall of the spacer 32. The substrate may be bonded to the inner wall of the spacer 32 with, for example, an adhesive.

In some embodiments, the reflection reducer 51 may include a flocked sheet. The flocked sheet may include, for example, a substrate such as paper or cloth with chemical fibers upright on the substrate. A black flocked sheet can further reduce reflection of the reflection-scattering light L11 than a flocked sheet in another color.

In the illumination apparatus 1B, for example, the reflection-scattering light L11 can be incident on the reflection reducer 51 after being reflected or scattered from at least any one of the first shield 6, the first lens optical system 3, or the housing 4 toward the inner wall of the spacer 32. The reflection reducer 51, which reduces reflection of the reflection-scattering light L11, reduces the reflection-scattering light L11 to be emitted through the emission opening 4a. The illumination apparatus 1B can thus emit the first light L1 with higher quality into the illumination space S1.

Figure 13:
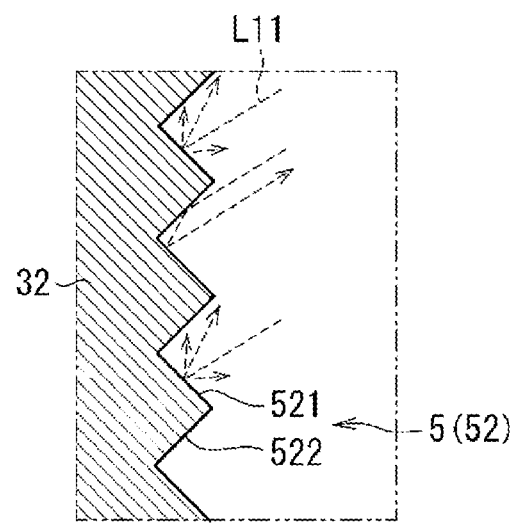
FIG. 13 is a schematic cross-sectional view of a light reducer with an example structure.

FIG. 13 is a partially enlarged schematic view of the light reducer 5 in another example. The light reducer 5 includes a recess-protrusion portion 52. The recess-protrusion portion 52 has a shape corresponding to, for example, the shape of the inner wall surface of the spacer 32. FIG. 13 schematically illustrates a part of the recess-protrusion portion 52. The recess-protrusion portion 52 includes recesses and protrusions arranged in the optical axis direction parallel to the optical axis AX1. In other words, the recess-protrusion portion 52 includes recesses and protrusions alternating in a cross section including the optical axis AX1.

In the example in FIG. 13, the recess-protrusion portion 52 is in the shape of a saw blade. The saw blade includes teeth (protrusions) each including a first surface 521 nearer the first light source 2 and a second surface 522 nearer the emission opening 4a. In the example in FIG. 13, each first surface 521 is inclined toward the optical axis AX1 at a smaller distance from the emission opening 4a in the optical axis direction. Each second surface 522 is inclined away from the optical axis AX1 at a smaller distance from the emission opening 4a in the optical axis direction. The recess-protrusion portion 52 includes the first surfaces 521 and the second surfaces 522 that are alternate and continuous with each other. As illustrated in FIG. 13, each first surface 521 and each second surface 522 may have substantially the same length. In other words, the first surface 521 and the second surface 522 may correspond to the equal sides of an isosceles triangle in a cross section (e.g., in the page of FIG. 13) including the optical axis AX1. The recess-protrusion portion 52 may have a helical shape similarly to an internal thread or may have a shape with multiple rings arranged in the optical axis direction. The recess-protrusion portion 52 includes recesses and protrusions at a pitch of, for example, less than or equal to about several millimeters.

The reflection-scattering light L11 is incident on the inner wall of the spacer 32 mainly obliquely from the first light source 2. Thus, more reflection-scattering light L11 is incident on the first surface 521 than on the second surface 522 in the inner wall of the spacer 32. The first surface 521 reflects or scatters the incident reflection-scattering light L11 mainly obliquely away from the emission opening 4a. The reflection-scattering light L11 is thus reflected or scattered a larger number of times and can attenuate effectively in the housing 4. The reflection-scattering light L11 is thus less likely to be emitted through the emission opening 4a.

When the reflection-scattering light L11 from the first light source 2 is incident on the second surface 522, the second surface 522 reflects or scatters the reflection-scattering light L11 mainly to the first surface 521, which then reflects or scatters the reflection-scattering light L11 obliquely toward the first light source 2. The reflection-scattering light L11 is thus less likely to be emitted through the emission opening 4a.

As described above, the light reducer 5 including the recess-protrusion portion 52 also reduces the reflection-scattering light L11 to be emitted through the emission opening 4a. In other words, the illumination apparatus 1B can emit the first light L1 with higher quality into the illumination space S1.

Figure 14:
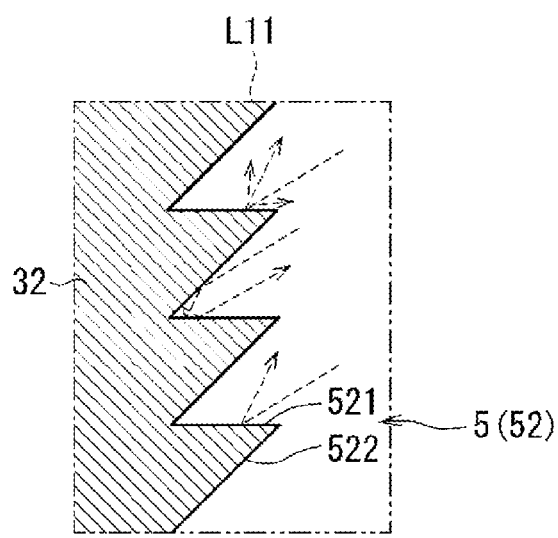
FIG. 14 is a schematic cross-sectional view of a light reducer with another example structure.

Although each first surface 521 and each second surface 522 have substantially the same length in the example in FIG. 13, the surfaces may have different lengths. FIG. 14 is a schematic diagram of the recess-protrusion portion 52 with another example structure. In the example in FIG. 14 as well, the recess-protrusion portion 52 has a shape corresponding to the shape of the inner wall surface of the spacer 32. In the example in FIG. 14, each second surface 522 is inclined away from the optical axis AX1 at a smaller distance from the emission opening 4a and has a greater length than each first surface 521. In the example in FIG. 14, each first surface 521 is substantially perpendicular to the optical axis AX1. In a cross section including the optical axis AX1, the first surface 521 corresponds to a leg of a right triangle, and the second surface 522 corresponds to the hypotenuse of the right triangle.

The reflection-scattering light L11 is incident on the inner wall surface of the spacer 32 as well mainly obliquely from the first light source 2. The first surface 521 reflects or scatters the incident reflection-scattering light L11 mainly away from the emission opening 4a. More specifically, the first surface 521 reflects or scatters the reflection-scattering light L11 mainly obliquely toward the first light source 2.

Although a portion of the reflection-scattering light L11 from the first surface 521 can be incident on the second surface 522, the first surface 521 can reflect or scatter a major portion of the reflection-scattering light L11 obliquely toward the first light source 2, with the second surface 522 being inclined.

When the reflection-scattering light L11 from the first light source 2 is incident on the second surface 522, the second surface 522 reflects or scatters the reflection-scattering light L11 to the first surface 521, which then reflects or scatters the reflection-scattering light L11 obliquely toward the first light source 2.

As described above, the reflection-scattering light L11 incident on the recess-protrusion portion 52 from the first light source 2 is mainly reflected or scattered obliquely toward the first light source 2. The reflection-scattering light L11 is thus less likely to be emitted through the emission opening 4a.

Figure 15:
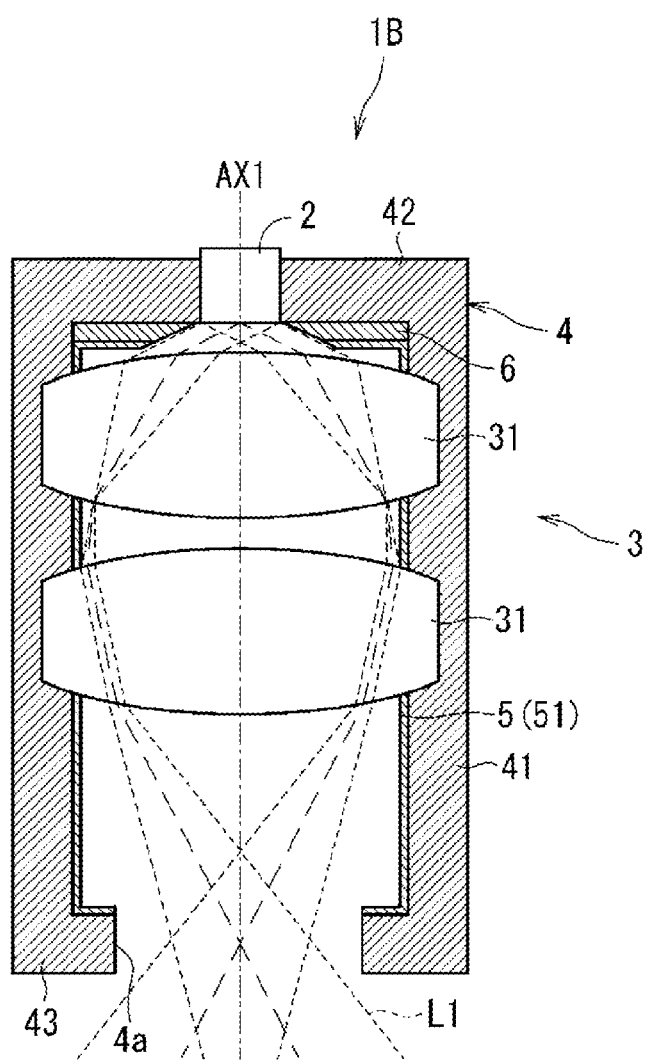
FIG. 15 is a schematic cross-sectional view of an illumination apparatus in a first implementation of the third embodiment.

Although the light reducer 5 is located on the inner wall of the spacer 32 in the above example, the light reducer 5 may be at any other position. FIG. 15 is a schematic cross-sectional view of the illumination apparatus 1B in a first implementation. In the example in FIG. 15, the light reducer 5 is located on the inner wall of the housing 4. The light reducer 5 may include the reflection reducer 51. The reflection reducer 51, which reduces reflection of the incident reflection-scattering light L11, reduces the reflection-scattering light L11 to be emitted into the illumination space S1 through the emission opening 4a.

The reflection reducer 51 may be located substantially entirely on the inner wall of the housing 4 as illustrated in FIG. 15 or may be located partially on the inner wall of the housing 4. For example, the reflection reducer 51 may be located entirely or partially on the inner surface of the side wall 41 surrounding the optical axis AX1. For example, the reflection reducer 51 may be located along the entire inner peripheral surface of the side wall 41. The reflection reducer 51 may be located on the surface of the first shield 6 adjacent to the first lens optical system 3.

Figure 16:
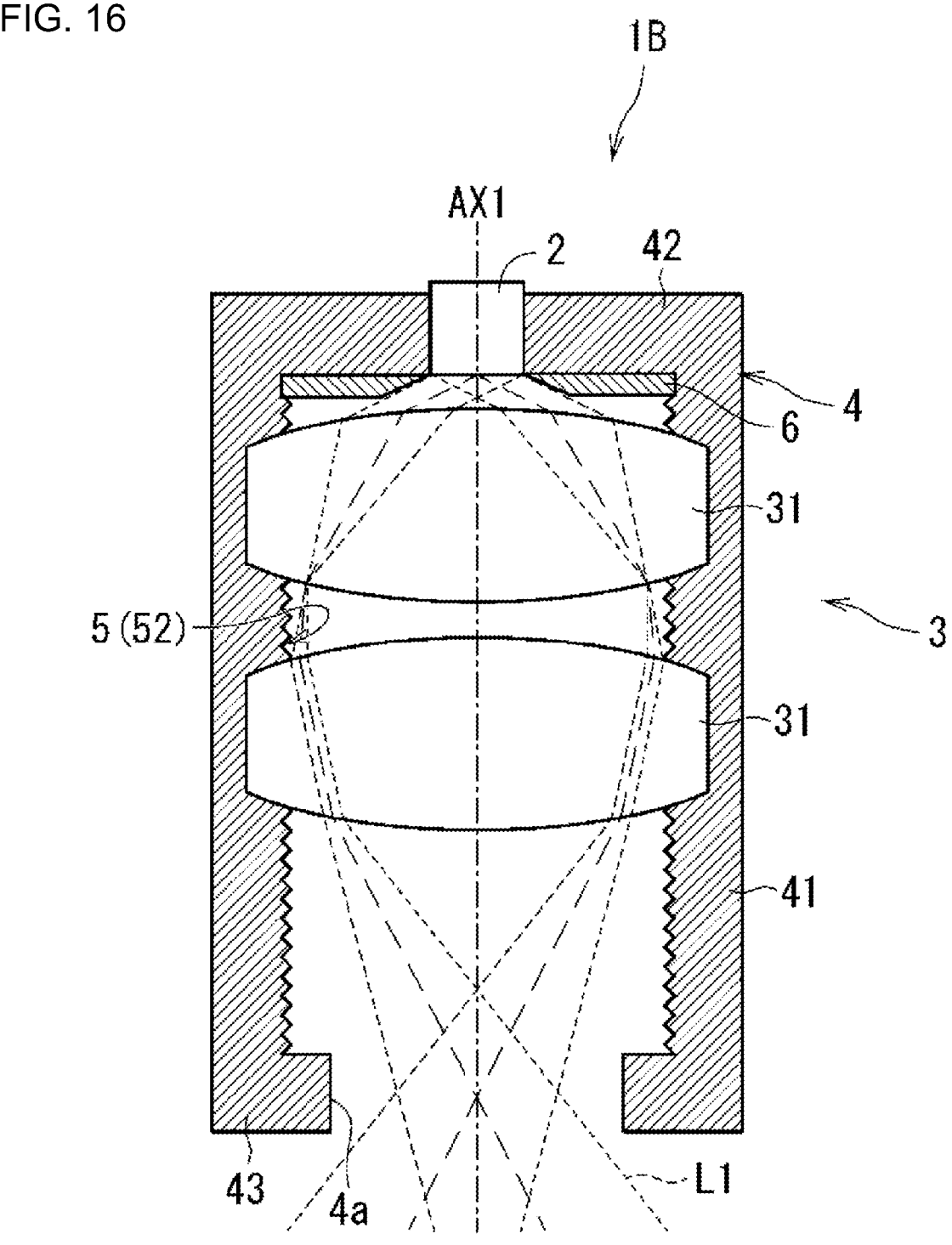
FIG. 16 is a schematic cross-sectional view of an illumination apparatus in a second implementation of the third embodiment.

FIG. 16 is a schematic cross-sectional view of the illumination apparatus 1B in a second implementation. As illustrated in FIG. 16, the light reducer 5 on the inner wall of the housing 4 may include the recess-protrusion portion 52. In other words, the inner wall of the housing 4 may include the recess-protrusion portion 52 as the light reducer 5. In this case, the recess-protrusion portion 52 may be located entirely or partially on the inner wall surface of the housing 4. The recess-protrusion portion 52 may be located entirely or partially at least on the inner surface of the side wall 41. For example, the recess-protrusion portion 52 is located along the entire inner peripheral surface of the side wall 41.

The reflection-scattering light L11 incident obliquely from the first light source 2 on the recess-protrusion portion 52 on the side wall 41 is mainly reflected or scattered obliquely toward the first light source 2. This reduces the reflection-scattering light L11 to be emitted into the illumination space S1 through the emission opening 4a.

Figure 17:
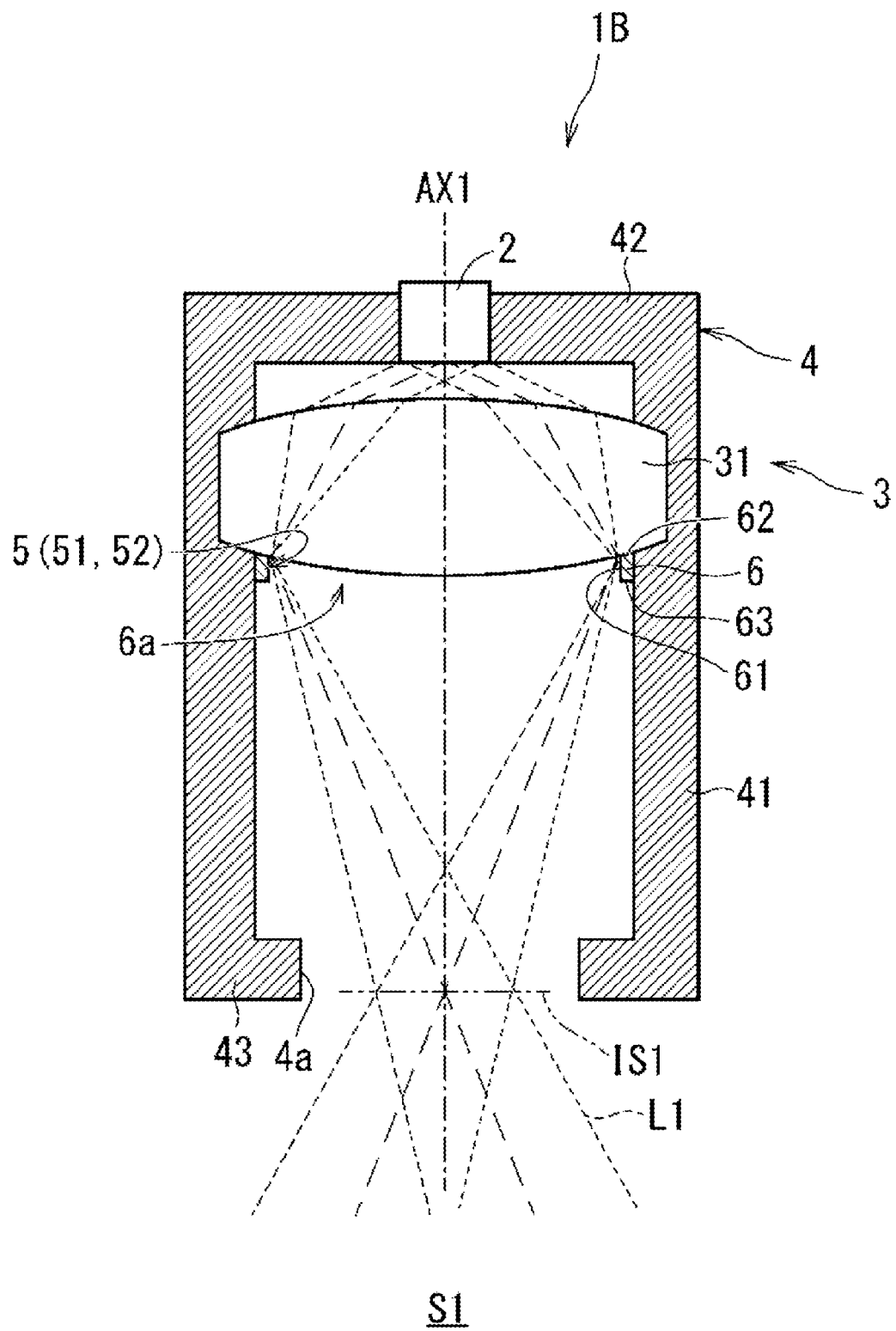
FIG. 17 is a schematic cross-sectional view of an illumination apparatus in a third implementation of the third embodiment.

FIG. 17 is a schematic cross-sectional view of the illumination apparatus 1B in a third implementation of the third embodiment. The illumination apparatus 1B in the third implementation differs from the illumination apparatus 1A in that the illumination apparatus 1B includes the light reducer 5. In the third implementation, the first shield 6 is near the aperture position, and the light reducer 5 is located on the first shield 6. In the example in FIG. 17, the light reducer 5 is located on the opening surface 61 defining the opening 6a in the first shield 6. The light reducer 5 may extend entirely along the opening surface 61. The light reducer 5 may include the reflection reducer 51 or the recess-protrusion portion 52.

The opening surface 61 of the first shield 6 with this structure reflects less reflection-scattering light L11 incident obliquely from the first light source 2, or reflects or scatters the reflection-scattering light L11 mainly obliquely toward the first light source 2. This reduces the reflection-scattering light L11 to be emitted into the illumination space S1 through the emission opening 4a.

The light reducer 5 may be located on a surface of the first shield 6 other than a surface 63 adjacent to the emission opening 4a. The surface 63 of the first shield 6 receives less incident reflection-scattering light L11 than the opening surface 61. The light reducer 5 may be located on a surface of the first shield 6 other than the surface 62 adjacent to the first light source 2. The surface 62 of the first shield 6 is likely to reflect or scatter the incident reflection-scattering light L11 toward the first light source 2, rather than directing the incident reflection-scattering light L11 outside through the emission opening 4a.

In the above example, the light reducer 5 is located on at least any one of the inner wall of the spacer 32, the inner wall of the housing 4, or the first shield 6. However, the structure is not limited to this example. The light reducer 5 may be at any position to be exposed in the internal space of the housing 4 without interfering with the first light L1 passing through the first lens optical system 3 to form an image on the image plane IS1. For example, the light reducer 5 may be located on the surface of a lens holder (not illustrated) holding the first lens 31.

The light reducer 5 may include both the reflection reducer 51 and the recess-protrusion portion 52. In this case, the reflection reducer 51 is located on the surface of the recess-protrusion portion 52.

Fourth Embodiment

Figure 18:
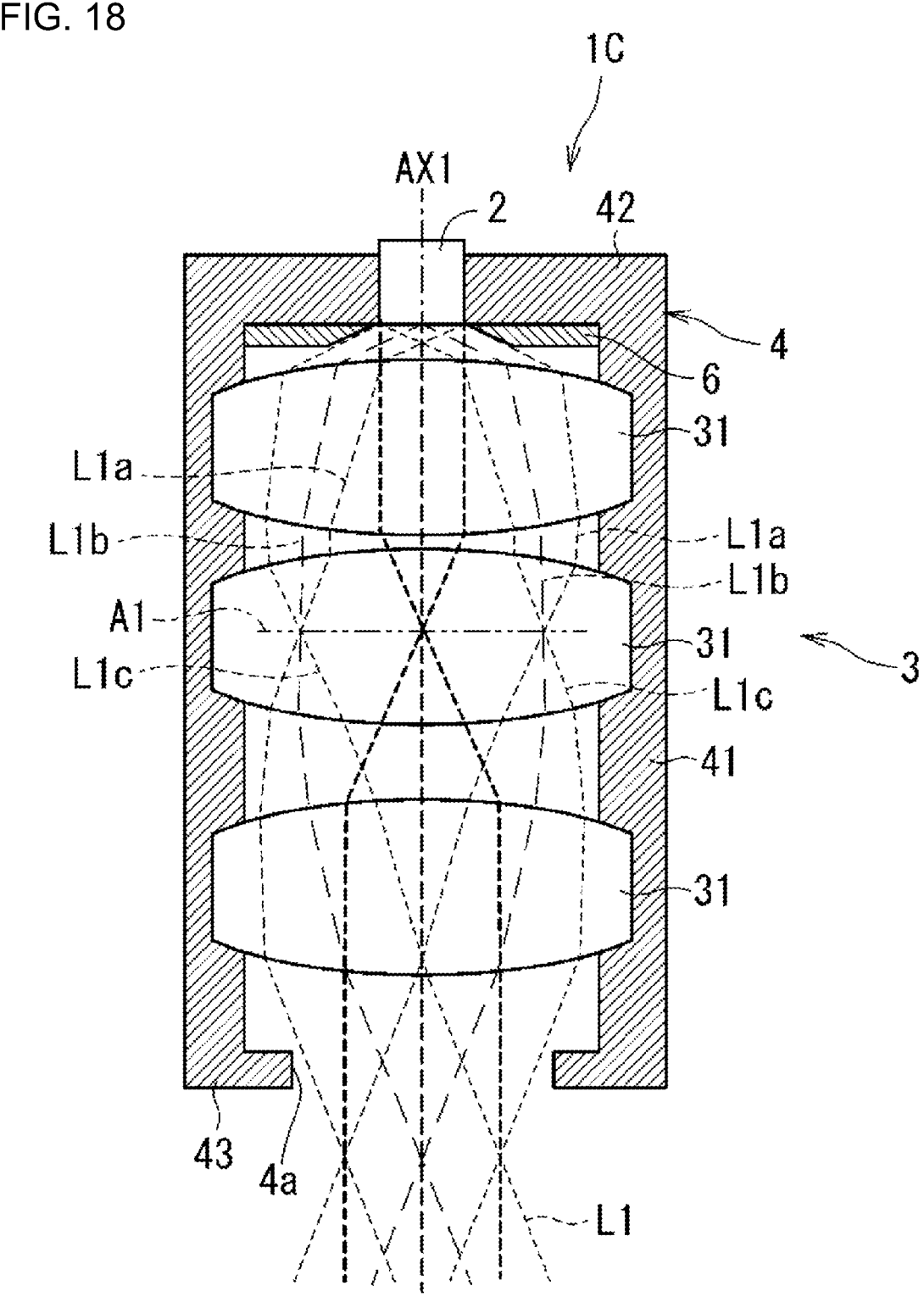
FIG. 18 is a schematic cross-sectional view of an illumination apparatus with an example structure according to a fourth embodiment.

FIG. 18 is a schematic cross-sectional view of an illumination apparatus 1C with an example structure according to a fourth embodiment. The illumination apparatus 1C differs from the illumination apparatus 1 in the specific structure of the first lens optical system 3. In the illumination apparatus 1C, the first lens optical system 3 includes a double telecentric optical system with multiple first lenses 31. In the double telecentric optical system, the main beams of the first light L1 are parallel to the optical axis AX1 adjacent to the first light source 2 and adjacent to the emission opening 4a. In the example in FIG. 18, the thick dashed lines indicate the main beams of the first light L1 emitted from points on the first emission portion 21.

The main beams are in the center of the first light L1 on a plane A1 perpendicular to the optical axis AX1 at the aperture position. As illustrated in FIG. 18, the first light portion L1a includes the main beam in the center of the first light L1 on the plane A1 and parallel to the optical axis AX1 adjacent to the first light source 2 and adjacent to the emission opening 4a. Similarly, the first light portion L1b includes the main beam parallel to the optical axis AX1 adjacent to the first light source 2 and adjacent to the emission opening 4a. The first light portion L1c includes the main beam parallel to the optical axis AX1 adjacent to the first light source 2 and adjacent to the emission opening 4a.

Although FIG. 18 schematically illustrates three first lenses 31, the number of first lenses 31 may be changed as appropriate. Although the first lenses 31 are biconvex lenses in the example in FIG. 18, any other lenses such as concave lenses may be used as appropriate.

In the illumination apparatus 1C, the main beams of the first light L1 emitted through the emission opening 4a are substantially parallel to one another without scattering. This reduces the divergence angle of the first light L1 emitted through the emission opening 4a. With such first light L1, the illumination apparatus 1C can illuminate a narrower illumination area and can be more inconspicuous.

Fifth Embodiment

Figure 19:
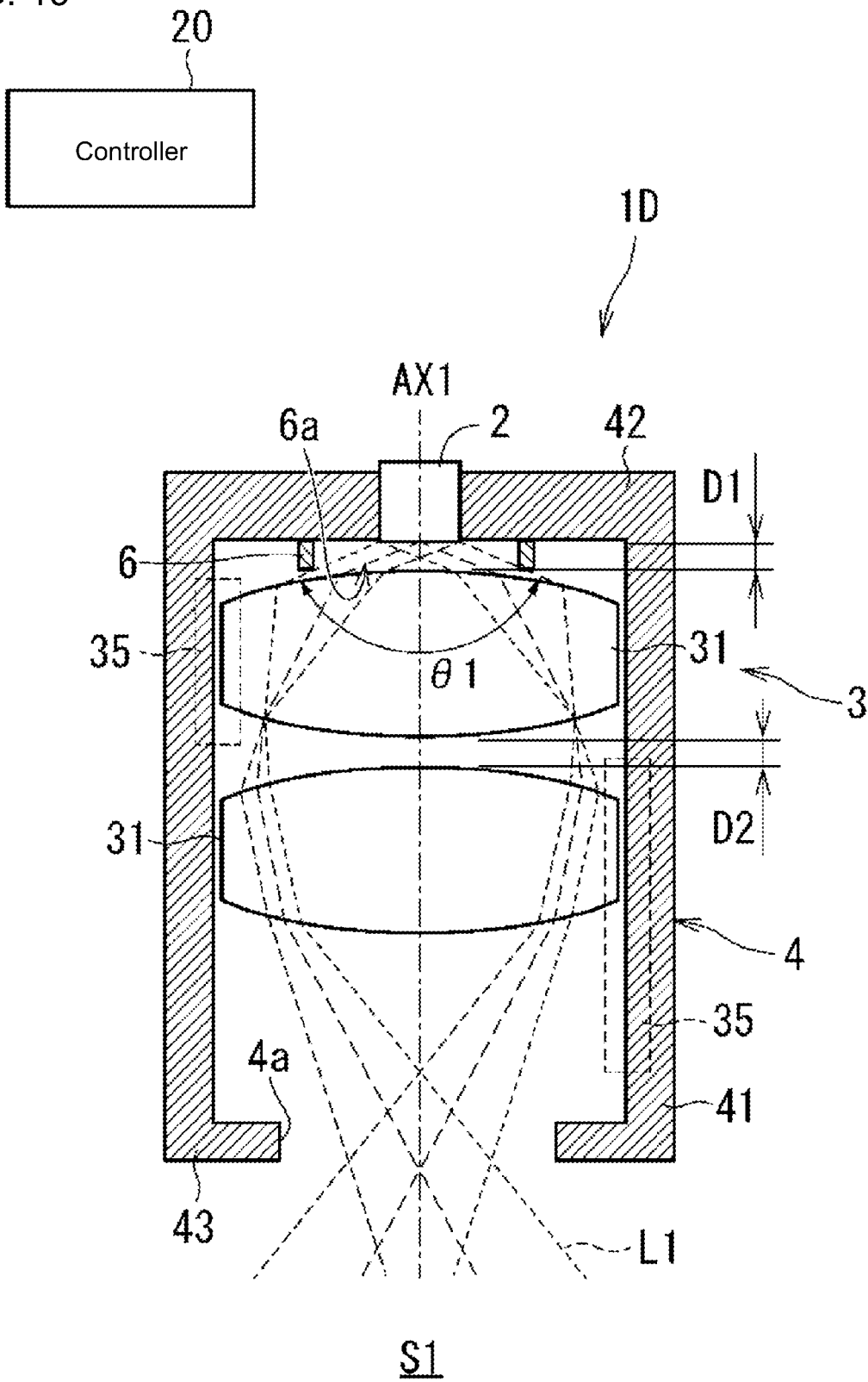
FIG. 19 is a schematic cross-sectional view of an illumination apparatus with an example structure according to a fifth embodiment.
Figure 20:
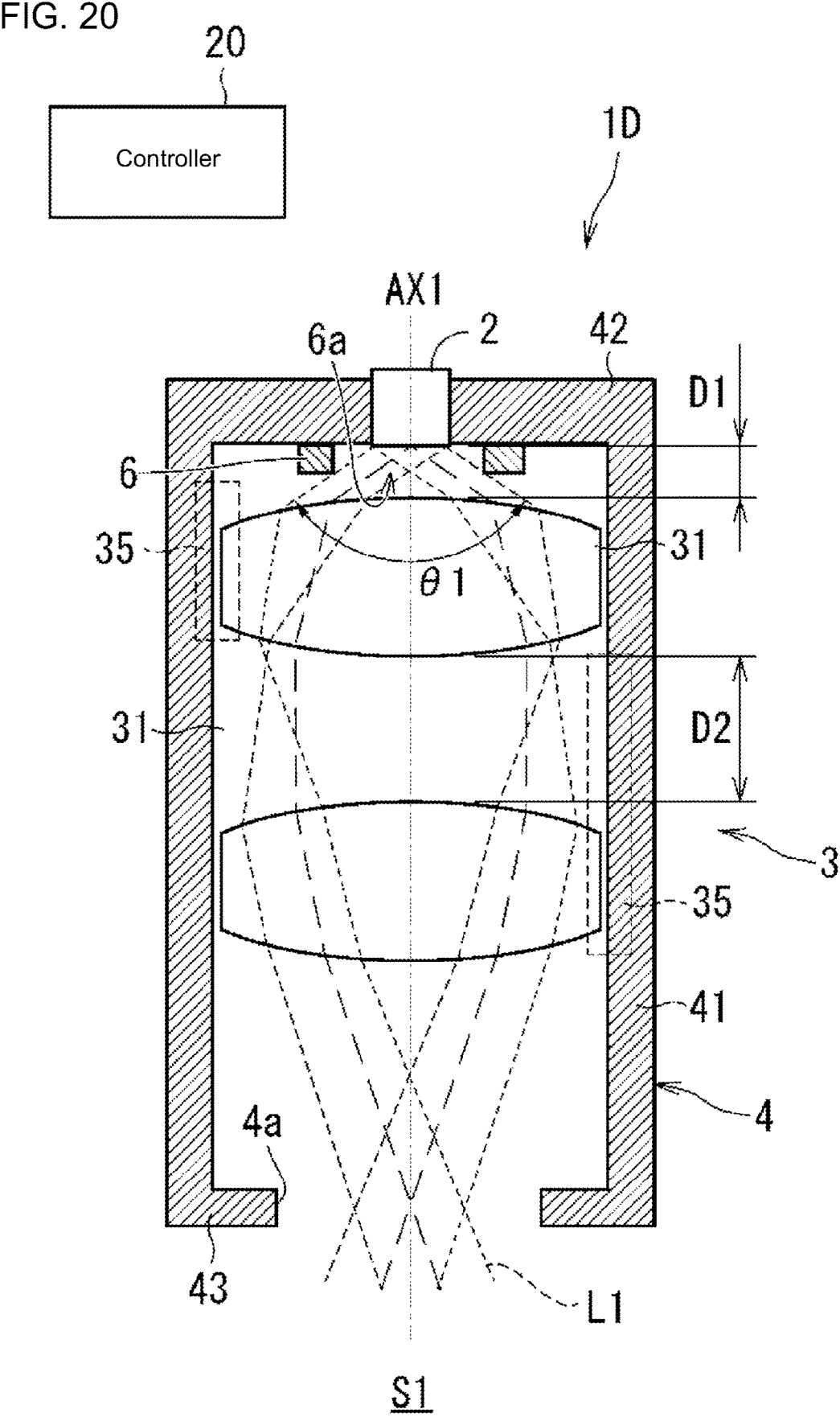
FIG. 20 is a schematic cross-sectional view of an illumination apparatus with an example structure according to the fifth embodiment.

FIGS. 19 and 20 are each a schematic cross-sectional view of an illumination apparatus 1D with an example structure according to a fifth embodiment. The illumination apparatus 1D differs from the illumination apparatus 1 in that the illumination apparatus 1D includes zoom assemblies 35.

Each zoom assembly 35 adjusts the position of the corresponding first lens 31 included in the first lens optical system 3 along the optical axis AX1 to adjust, through zooming, the divergence angle of the first light L1 emitted through the emission opening 4a. For example, the zoom assembly 35 may include, but is not limited to, a ball screw assembly. The ball screw assembly includes a lead screw extending in the optical axis direction, a carriage fastened to the lead screw by screwing, a lens holder connected to the carriage to hold the first lens 31, and a motor that rotates the lead screw. As the lead screw rotates, the carriage, the lens holder, and the first lens 31 move together in the optical axis direction. The motor is controlled by, for example, a controller 20.

The controller 20 may be a control circuit. The controller 20 includes at least one processor that performs control and processing for implementing various functions, as described in more detail below.

In various embodiments, the processor(s) may be a single integrated circuit (IC), multiple ICs connected to one another for mutual communication, or discrete circuits. The processor(s) may be implemented using various known techniques.

In one embodiment, the processor includes one or more circuits or units that perform one or more data computation procedures or processes by, for example, executing instructions stored in an associated memory. In another embodiment, the processor may be firmware (e.g., a discrete logic component) to perform one or more data computation procedures or processes.

In various embodiments, the processor may be one or more processors, controllers, microprocessors, microcontrollers, application-specific integrated circuits (ASICs), digital signal processors, programmable logic devices, or field programmable gate arrays, or may include any combination of these devices or components or any combination of other known devices and components to implement the functions described below.

The housing 4 may include multiple cylinders movable in the optical axis direction together with the first lenses 31. More specifically, each zoom assembly 35 may move the first lens 31 and the cylinder together. The housing 4 with this structure has the size in the optical axis direction changeable based on the positions of the first lenses 31.

A spacing D1 between the first emission portion 21 of the first light source 2 and the first lens 31 and a spacing D2 between the two adjacent first lenses 31 are larger in FIG. 20 than in FIG. 19. The illumination apparatus 1D in FIG. 20 can thus emit the first light L1 with a reduced divergence angle through the emission opening 4a.

As described above, the illumination apparatus 1D includes the zoom assemblies 35 that adjust the positions of the first lenses 31 to adjust the divergence angle of the first light L1 emitted through the emission opening 4a. This can adjust the illumination area.

The zoom assemblies 35 adjusting the positions of the first lenses 31 change the numerical aperture of the first lens optical system 3 and thus change the angle θ2 defining the numerical aperture. In this example, the divergence angle θ1 may be set to a value less than or equal to the minimum value possible for the angle θ2 after the first lenses 31 are moved, or may be changeable based on the angle θ2. More specifically, the first shield 6 may include an aperture assembly 64 that changes the size of the opening 6a.

Figure 21:
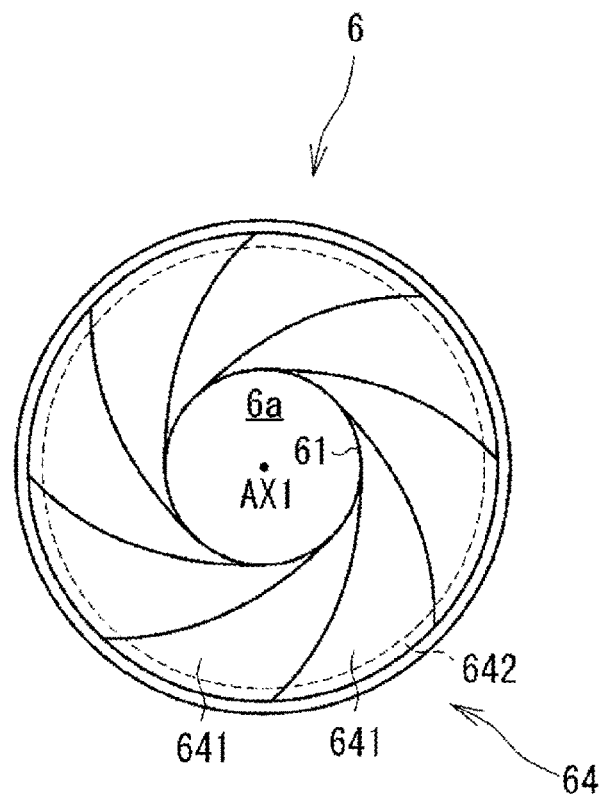
FIG. 21 is a schematic plan view of a first shield with an example structure.

FIG. 21 is a schematic plan view of the first shield 6 with an example structure. The aperture assembly 64 includes multiple aperture blades 641 and a rotary member 642. The aperture blades 641 are arranged circumferentially about the optical axis AX1. Each aperture blade 641 has an end defining a part of the opening surface 61. The rotary member 642 is, for example, an annular plate surrounding the optical axis AX1 for moving the aperture blades 641. The rotary member 642 is connected to the aperture blades 641 in a movable manner. When the rotary member 642 rotates about the optical axis AX1, the aperture blades 641 moves to change the size of the opening 6a. The aperture assembly 64 includes, for example, a drive such as a motor (not illustrated) that rotates the rotary member 642. The aperture assembly 64 is controlled by, for example, the controller 20.

The controller 20 controls the aperture assembly 64 based on the positions of the first lenses 31 to cause the divergence angle θ1 to be less than or equal to the angle θ2. For example, the controller 20 receives an external signal indicating the divergence angle of the first light L1 to be emitted from the illumination apparatus 1D. In response to the signal, the controller 20 controls the zoom assemblies 35 and the aperture assembly 64. More specifically, the controller 20 adjusts the positions of the first lenses 31 by controlling the zoom assemblies 35 to cause the illumination apparatus 1D to emit the first light L1 at the divergence angle indicated by the signal. The controller 20 also adjusts the size of the opening 6a by controlling the aperture assembly 64 to cause the divergence angle θ1 to be less than or equal to the angle θ2 of the first lens optical system 3 after the first lenses 31 are moved.

The first light L1 from the first light source 2 can thus pass through the active area of the first lens optical system 3 after the first lenses 31 are moved by the zoom assemblies 35. In other words, the first light L1 from the first light source 2 is substantially not transmitted through the edges of the first lenses 31. The illumination apparatus 1D can thus emit the first light L1 with high quality into the illumination space S1 independently of the positions of the first lenses 31.

The controller 20 may control the aperture assembly 64 to increase the divergence angle θ1 as the angle θ2 increases. At a larger angle θ2, the controller 20 can cause more first light L1 to enter the first lens optical system 3, thus causing more first light L1 to be emitted through the emission opening 4a. The structure allows more efficient use of the first light L1 emitted from the first emission portion 21 of the first light source 2.

Although the first shield 6 is between the first emission portion 21 and the first lens optical system 3 in the above example, the first shield 6 may be at the aperture position. In this case, the zoom assemblies 35 may move the first shield 6, in addition to the first lenses 31. More specifically, the zoom assemblies 35 may move the first shield 6 to a position near the aperture position when the aperture position is changed with the first lenses 31 moved by the zoom assemblies 35.

Sixth Embodiment

Figure 22:
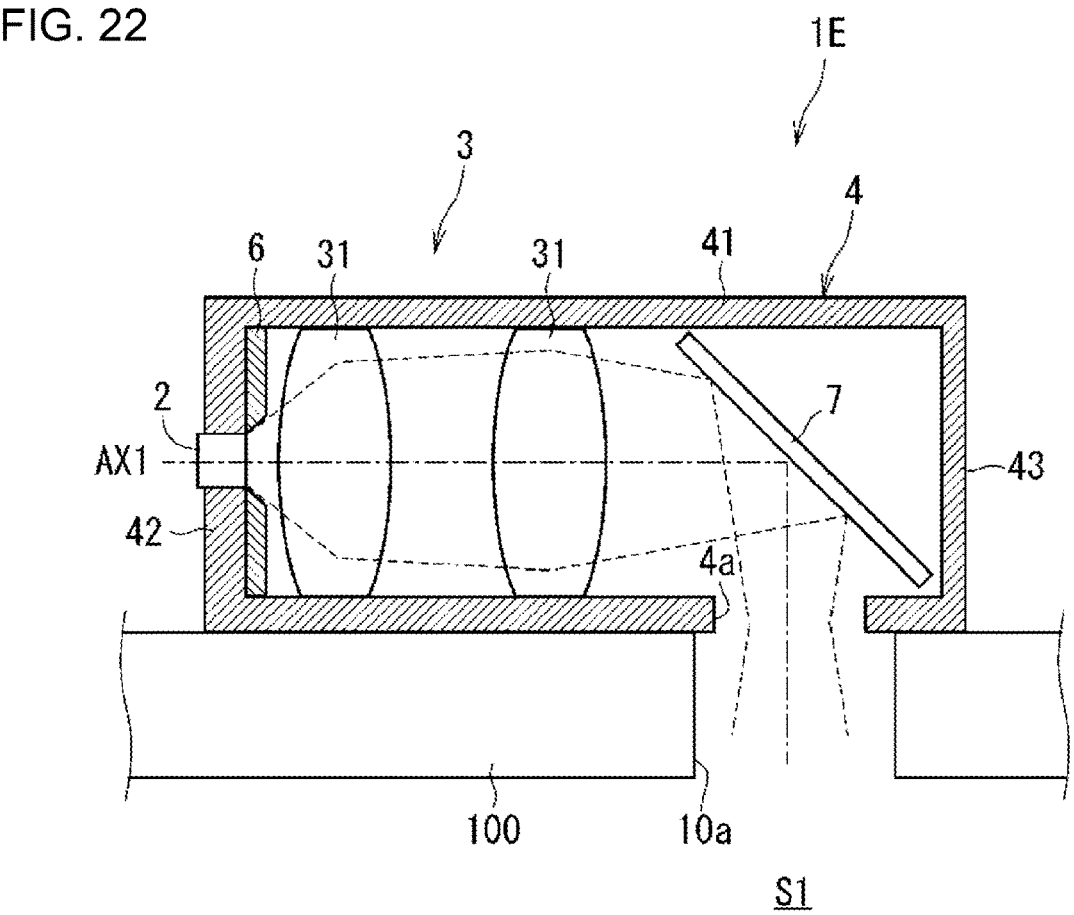
FIG. 22 is a schematic cross-sectional view of an illumination apparatus with an example structure according to a sixth embodiment.

FIG. 22 is a schematic cross-sectional view of an illumination apparatus 1E with an example structure according to a sixth embodiment. The illumination apparatus 1E differs from the illumination apparatus 1 in that the illumination apparatus 1E includes a reflector 7 and includes the emission opening 4a at a position different from the position of the illumination apparatus 1.

The reflector 7 is located inside the housing 4 to reflect the first light L1 to change its traveling direction. The reflector 7 includes, for example, a mirror or a prism. In the example in FIG. 22, the reflector 7 is located downstream from the first lens optical system 3 on the path of the first light L1. The reflector 7 reflects the first light L1 passing through the first lens optical system 3 toward the emission opening 4a.

In the example in FIG. 22, the emission opening 4a is located in the side wall 41, rather than in the second member 43 of the housing 4. The emission opening 4a extends through the side wall 41 in the thickness direction to connect the internal space of the housing 4 with the illumination space S1. In the example in FIG. 22, the emission opening 4a faces the reflector 7 in the radial direction about the central axis of the side wall 41. The first light L1 from the reflector 7 passes through the emission opening 4a and is emitted into the illumination space S1.

In the illumination apparatus 1E with this structure, the reflector 7 can redirect the first light L1 emitted from the first light source 2. This increases the flexibility in the position of the emission opening 4a.

In the example in FIG. 22, the reflector 7 reflects the first light L1 downward substantially at a right angle downstream from the first lens optical system 3. When the illumination apparatus 1E with this structure is installed on the ceiling in the illumination space S1, the illumination apparatus 1E can be located in a space above the ceiling and oriented to cause the first light source 2 to emit the first light L1 substantially parallel to the horizontal direction. FIG. 22 illustrates a ceiling board 100 defining the ceiling surface in the illumination space S1. The ceiling board 100 includes an opening 10a vertically extending through the ceiling board 100. The illumination apparatus 1E is located above the ceiling board 100 with the emission opening 4a facing the opening 10a.

The illumination apparatus 1E with this structure can be smaller in the vertical direction, although being larger in the horizontal direction with the multiple first lenses 31 in the first lens optical system 3 horizontally aligned. The illumination apparatus 1E can thus be installed in a space with a lower height above the ceiling. Thus, the illumination apparatus 1E can be effectively installed on the ceiling in the illumination space S1.

Figure 23:
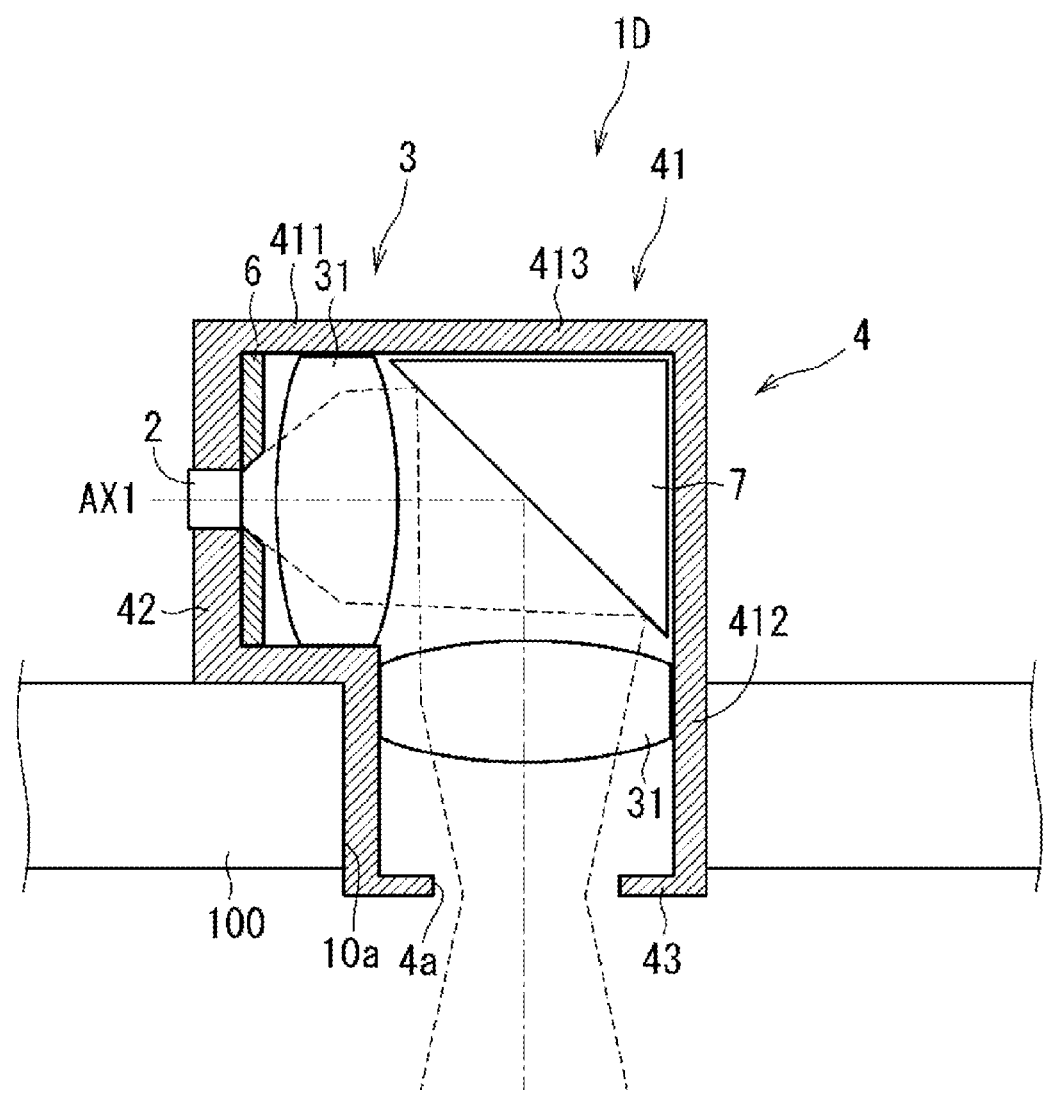
FIG. 23 is a schematic cross-sectional view of an illumination apparatus in another implementation of the sixth embodiment.

FIG. 23 is a schematic cross-sectional view of the illumination apparatus 1E in another implementation. In the example in FIG. 23, the reflector 7 is between two first lenses 31 on the path of the first light L1. The first lens 31 nearer the first light source 2 is hereafter referred to as a first-A lens 31. The first lens 31 nearer the emission opening 4a is referred to as a first-B lens 31.

In the example in FIG. 23, the side wall 41 of the housing 4 defines an L-shaped internal space. More specifically, the side wall 41 extends from the periphery of the first member 42 in the traveling direction of the first light L1, bends at a position corresponding to the reflector 7, and extends in the traveling direction of the first light L1 from the reflector 7 to the periphery of the second member 43. The side wall 41 is substantially in the shape of an L-pipe. The side wall 41 includes a portion (first portion 411) upstream from the reflector 7, a portion (second portion 412) downstream from the reflector 7, and a portion (connection portion 413) connecting the first portion 411 and the second portion 412.

The first-A lens 31 included in the first lens optical system 3 is between the first light source 2 and the reflector 7. The first-A lens 31 is located in the first portion 411. The first-B lens 31 included in the first lens optical system 3 is between the reflector 7 and the emission opening 4a in the second member 43. The first-B lens 31 is located in the second portion 412. The reflector 7 is located in the connection portion 413.

When the illumination apparatus 1E in this implementation is installed on the ceiling in the illumination space S1, the illumination apparatus 1E can be located in a space above the ceiling and oriented to cause the first light source 2 to emit the first light L1 substantially parallel to the horizontal direction. The illumination apparatus 1E can thus be installed in a space with a lower height above the ceiling. In the illumination apparatus 1E in this implementation, the second portion 412 can be received in the opening 10a in the ceiling board 100. The illumination apparatus 1E with this structure can be smaller in the space above the ceiling.

Seventh Embodiment

Figure 24:
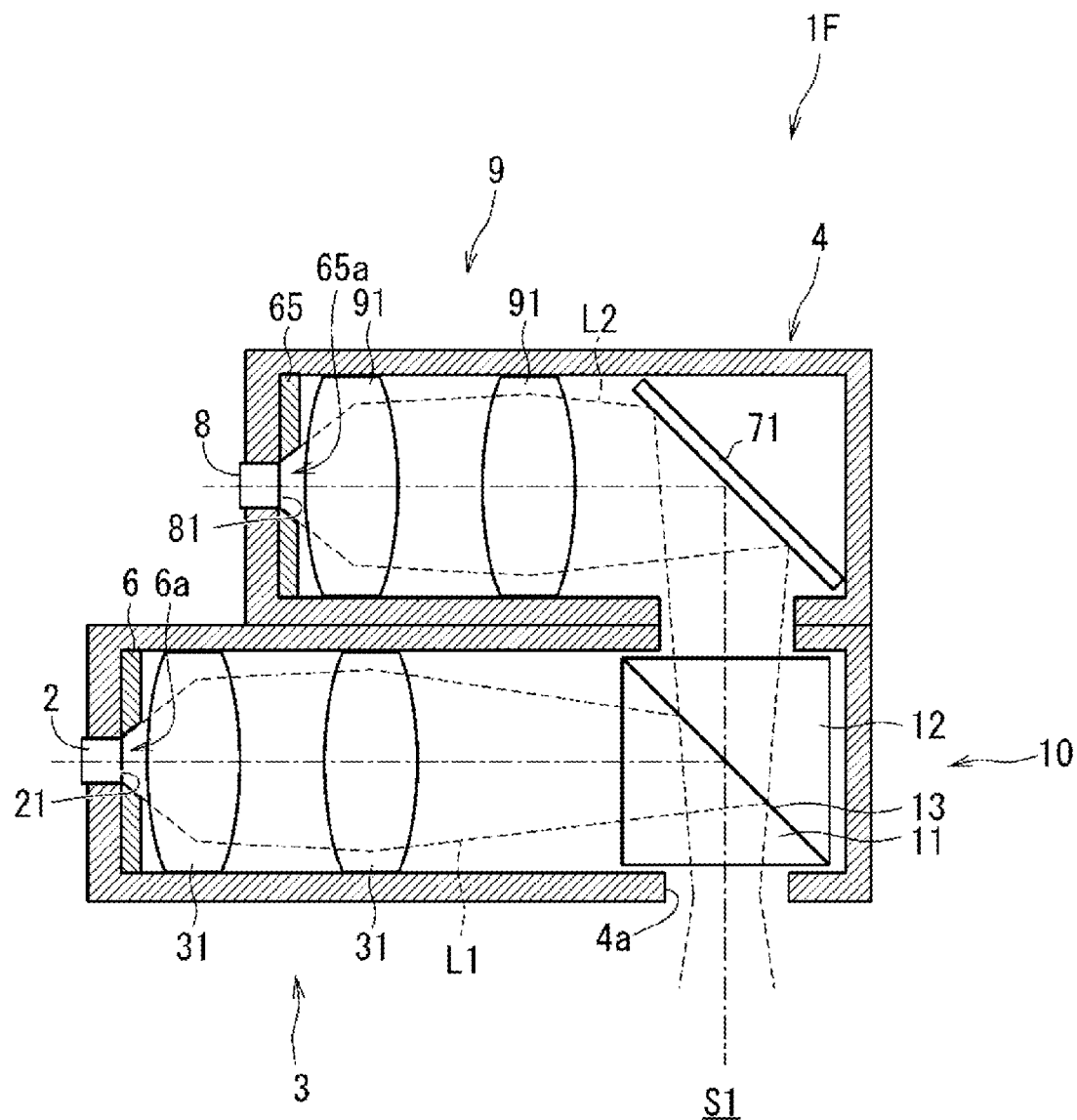
FIG. 24 is a schematic cross-sectional view of an illumination apparatus with a structure according to a seventh embodiment.

FIG. 24 is a schematic cross-sectional view of an illumination apparatus 1F with an example structure according to a seventh embodiment. The illumination apparatus 1F differs from the illumination apparatus 1 in that the illumination apparatus 1F includes a second light source 8, a second shield 65, a second lens optical system 9, and a combiner 10. As illustrated in FIG. 24, the housing 4 accommodates at least the first lens optical system 3, the second lens optical system 9, the first shield 6, the second shield 65, and the combiner 10. The housing 4 thus has a shape different from the shape of the housing 4 in the illumination apparatus 1.

The second light source 8 includes a second emission portion 81 to emit second light L2 from the first light source 2. The second light L2 differs from the first light L1. The second light L2 differs from the first light L1 in the wavelength range and is, for example, visible light. In a specific example, the second light source 8 has a structure that is the same as or similar to the structure of the first light source 2.

In the example in FIG. 24, the second light source 8 is also fixed to the housing 4. The second light source 8 emits the second light L2 into the internal space of the housing 4. In the example in FIG. 24, the second light source 8 emits the second light L2 parallel to the traveling direction of the first light L1 from the first light source 2. The second light L2 from the second light source 8 diverges while traveling similarly to the first light L1.

The second shield 65 is inside the housing 4. The second shield 65 includes an opening 65a to allow passage of the second light L2. The second shield 65 has the same or similar shape as the first shield 6. In the example in FIG. 24, the second shield 65 is between the second emission portion 81 and the second lens optical system 9. Similarly to the first shield 6, the second shield 65 may be near the aperture position of the second lens optical system 9.

The second lens optical system 9 is inside the housing 4. The second lens optical system 9 is an optical imaging system that forms an image of the second light L2 from the second light source 8 on an imaginary image plane adjacent to the emission opening 4a. The image plane is located in, for example, the emission opening 4a, similarly to the image plane IS1. The second lens optical system 9 includes one or more second lenses 91. In the example in FIG. 24, multiple (two in this example) second lenses 91 are aligned with a spacing in between on the path of the second light L2. In a specific example, the second lenses 91 are the same as or similar to the first lenses 31.

In the example in FIG. 24, a set of the second light source 8 and the second lens optical system 9 is located parallel to a set of the first light source 2 and the first lens optical system 3. In the example in FIG. 24, the apparatus includes a reflector 71 located downstream from the second lens optical system 9. The reflector 71 reflects the second light L2 from the second lens optical system 9 toward the combiner 10. In the example in FIG. 24, the reflector 71 is located above the combiner 10 in the housing 4 and faces the combiner 10 in the vertical direction. The reflector 71 includes, for example, a mirror or a prism.

The combiner 10 combines the first light L1 and the second light L2. For example, the combiner 10 includes a first prism 11, a second prism 12, and a filter film 13. In the example in FIG. 24, the first prism 11 and the second prism 12 are each in the shape of an isosceles triangle with their oblique surfaces facing each other.

The filter film 13 is located on the oblique surfaces of the first prism 11 and the second prism 12 to reflect the first light L1 and transmit the second light L2. More specifically, the filter film 13 has a higher transmittance for the wavelength range of the second light L2 than for the wavelength range of the first light L1, and has a higher reflectance for the wavelength range of the first light L1 than for the wavelength range of the second light L2. The filter film 13 with such characteristics may include, for example, a dielectric multilayer film. The dielectric multilayer film includes, for example, multiple dielectric thin films stacked on one another. The dielectric is made of, for example, one or more of $TiO_2$, $SiO_2$, $Nb_2O_5$, $Ta_2O_5$, or $MgF_2$.

In the example in FIG. 24, the first light L1 is transmitted through the first prism 11 in the combiner 10 and is incident on the filter film 13 at an angle of 45 degrees. The first light L1 is reflected from the filter film 13. In the example in FIG. 24, the first light L1 travels downward in the vertical direction after being reflected. The second light L2 is transmitted through the second prism 12 and is incident on the filter film 13 at an angle of 45 degrees. The second light L2 is transmitted through the filter film 13 and combines with the first light L1 reflected from the filter film 13. In other words, the first light L1 and the second light L2 travel integrally downstream from the filter film 13.

The housing 4 includes the emission opening 4a at a position to allow passage of the first light L1 and the second light L2 from the combiner 10. In the example in FIG. 24, the emission opening 4a faces the combiner 10 in the vertical direction. The first light L1 and the second light L2 from the combiner 10 pass through the emission opening 4a in the housing 4 and are emitted into the illumination space S1.

In the illumination apparatus 1F, the second lens optical system 9 has an imaging magnification less than or equal to the ratio of the size of the emission opening 4a to the size of the second light L2 on the second emission portion 81 of the second light source 8. Thus, the second light L2 has a size smaller than or equal to the size of the emission opening 4a when passing through the emission opening 4a. The second light L2 is thus less likely to be reflected or scattered from the periphery of the emission opening 4a.

The imaging magnification of the second lens optical system 9 may be set to cause the second light L2 to have a smaller size than the emission opening 4a when passing through the emission opening 4a. This can further reduce reflection-scattering light.

In the illumination apparatus 1F, the divergence angle formed on the second emission portion 81 by the two outermost beams of the second light L2 passing through the opening 65a in the second shield 65 is less than or equal to the angle defining the numerical aperture of the second lens optical system 9. This allows the second light L2 to pass through the active area of the second lens optical system 9 after passing through the opening 65a in the second shield 65. The second light L2 passing through the opening 65a in the second shield 65 is substantially not incident on the edges of the second lenses 91. This reduces or avoids unintended scattering of the second light L2.

The illumination apparatus 1F can thus emit the second light L2 with high quality into the illumination space S1. The illumination apparatus 1F can thus emit light with a wider wavelength range including the first light L1 and the second light L2 into the illumination space S1.

Figure 25:
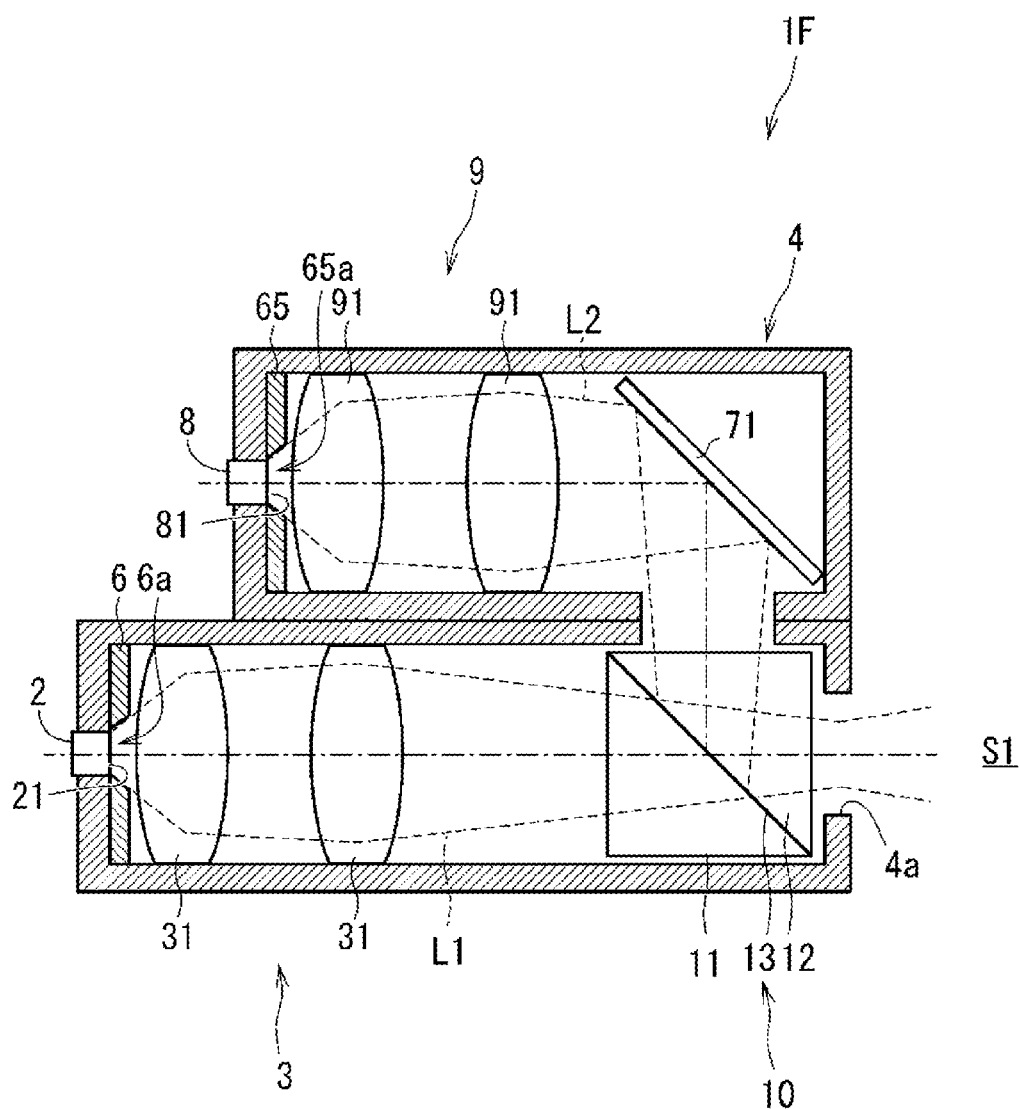
FIG. 25 is a schematic cross-sectional view of an illumination apparatus in a first implementation of the seventh embodiment.

FIG. 25 is a schematic cross-sectional view of the illumination apparatus 1F in a first implementation. In the example in FIG. 25, the filter film 13 in the combiner 10 transmits the first light L1 and reflects the second light L2. In the example in FIG. 25, the housing 4 includes the emission opening 4a facing the combiner 10 in the lateral direction.

Figure 26:
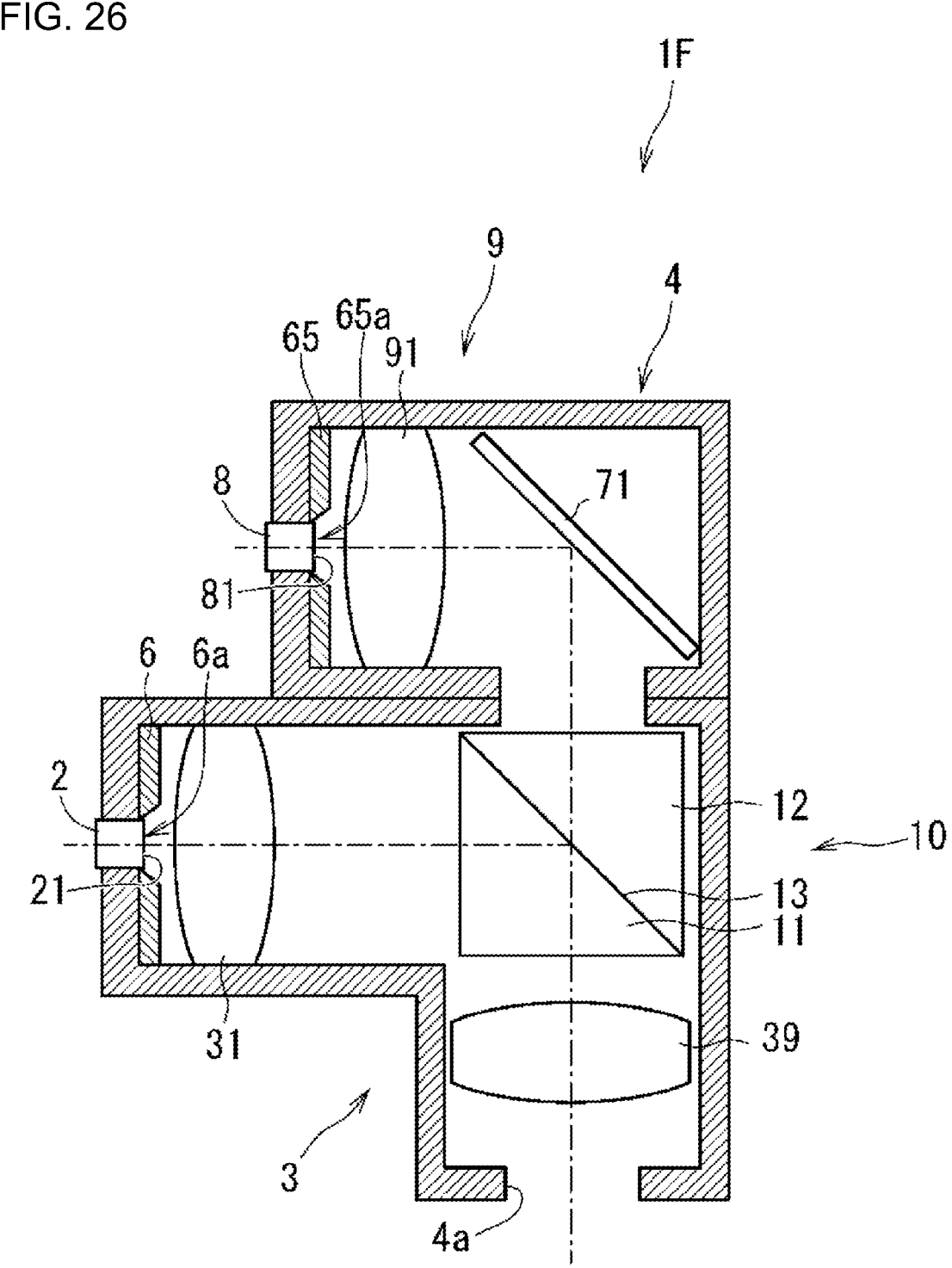
FIG. 26 is a schematic cross-sectional view of an illumination apparatus in a second implementation of the seventh embodiment.

FIG. 26 is a schematic diagram of the illumination apparatus 1F in a second implementation. In the example in FIG. 26, the apparatus includes a lens 39 between the combiner 10 and the emission opening 4a in the housing 4. The first light L1 and the second light L2 from the combiner 10 enter the lens 39. More specifically, in the example in FIG. 26, the first lens 31 and the lens 39 are included in the first lens optical system 3, and the second lens 91 and the lens 39 are included in the second lens optical system 9. The lens 39 thus serves as both the first lens 31 and the second lens 91.

The illumination apparatus 1F, in which the first lens optical system 3 and the second lens optical system 9 share the lens 39, can be smaller and manufactured at a lower cost.

The illumination apparatuses 1 and 1A to 1F described above in detail are illustrative in all respects, and are not limited to the above examples. Many variations not specifically described above may be implemented without departing from the scope of the disclosure. The components described in the above embodiments and variations may be combined or eliminated as appropriate unless any contradiction arises.

The components described in the above embodiments and variations may be entirely or partially combined as appropriate unless any contradiction arises.

As illustrated in FIG. 1, the first shield 6 may be between the first emission portion 21 and the first lens optical system 3 and may include the opening surface 61 being a reflective surface inclined with respect to the optical axis AX1. In this case, the first light L1 traveling straight through the opening 6a and the first light L1 reflected from the opening surface 61 enter the first lens optical system 3. Light beams traveling straight through the opening 6a are hereafter referred to as straight light beams. Light beams reflected from the opening surface 61 are referred to as reflected light beams. The reflected light beams are optically equivalent to light beams emitted from points located outward from the first emission portion 21 and entering the first lens optical system 3. Thus, the reflected light beams form an image outward from the area of the image plane IS1 on which the straight light beams form an image.

Such reflected light beams may also pass through the emission opening 4a. Thus, the first lens optical system 3 may have an imaging magnification with the size M1 of the first light L1 equal to, for example, the size of the opening 6a in the first shield 6. More specifically, the size M1 may be equal to the size of the opening 6a in the surface of the first shield 6 adjacent to the first lens optical system 3. In other words, the first lens optical system 3 may have an imaging magnification less than or equal to the ratio of the size of the emission opening 4a to the size of the opening 6a. This allows an image of the first light L1 including the straight light beams and the reflected light beams formed on the image plane IS1 to have a size smaller than or equal to the size of the emission opening 4a. This further reduces reflection-scattering light in the housing 4, thus allowing emission of the first light L1 with less unevenness.

The invention claimed is:

1. An illumination apparatus, comprising:
   a housing including a first opening;
   a first light source including a first emission portion to emit first light into an internal space of the housing;
   a first lens optical system including at least one first lens between the first emission portion and the first opening in the housing on a path of the first light, the first lens optical system being configured to form an image of the first light from the first emission portion on an imaginary image plane adjacent to the first opening and configured to cause the first light to be emitted through the first opening;
   a light reducer configured to absorb reflection-scattering light entering the internal space of the housing, the reflection-scattering light being the first light reflected or scattered, the light reducer is located on an inner wall of the housing; and
   at least one shield located on the path of the first light and including a second opening to allow passage of the first light,
   wherein:
   the first light is partially incident on the at least one shield, and
   two outermost beams of the first light on the first emission portion form a smaller angle after passing through the second opening in the at least one shield than before passing through the second opening.

2. The illumination apparatus according to claim 1, wherein
   the at least one shield includes a member having an absorptivity of the first light incident on the member being higher than or equal to 60%.

3. The illumination apparatus according to claim 1, wherein
   the at least one shield is spaced from the first emission portion in an optical axis direction.

4. The illumination apparatus according to claim 1, wherein
   the at least one shield includes a surface defining the second opening, and the surface is spaced from the first emission portion in a direction perpendicular to an optical axis direction.

5. The illumination apparatus according to claim 1, wherein
   the second opening in the at least one shield has a same width as the first emission portion.

6. The illumination apparatus according to claim 1, wherein
the at least one shield is between the first emission portion and the first lens optical system.

7. The illumination apparatus according to claim 1, wherein
the at least one first lens includes a first-A lens and a first-B lens aligned in an optical axis direction of the first light.

8. The illumination apparatus according to claim 7, wherein
the first light has a smaller diameter when passing between the first-A lens and the first-B lens than when passing through each of the first-A lens and the first-B lens.

9. The illumination apparatus according to claim 1, wherein
the image plane is located in the first opening.

10. The illumination apparatus according to claim 1, wherein:
the at least one first lens includes a first-A lens and a first-B lens,
the first lens optical system further includes a spacer between the first-A lens and the first-B lens to define a spacing between the first-A lens and the first-B lens, and
the light reducer is located on an inner wall of the spacer.

11. The illumination apparatus according to claim 1, wherein
the light reducer is located on the at least one shield.

12. The illumination apparatus according to claim 1, wherein
the first lens optical system includes a double telecentric optical system.

13. The illumination apparatus according to claim 1, further comprising:
a zoom assembly configured to move the at least one first lens along an optical axis of the first light.

14. The illumination apparatus according to claim 13, wherein
the at least one shield includes an aperture assembly configured to change a size of the second opening based on a position of the at least one first lens.

15. An illumination apparatus comprising:
a housing including a first opening;
a first light source including a first emission portion to emit first light into an internal space of the housing;
a first lens optical system including at least one first lens between the first emission portion and the first opening in the housing on a path of the first light, the first lens optical system being configured to form an image of the first light from the first emission portion on an imaginary image plane adjacent to the first opening and configured to cause the first light to be emitted through the first opening; and
at least one shield located on the path of the first light and including a second opening to allow passage of the first light,
wherein:
the first light is partially incident on the at least one shield, and
two outermost beams of the first light on the first emission portion form a smaller angle after passing through the second opening in the at least one shield than before passing through the second opening,
the first lens optical system has an imaging magnification less than or equal to a ratio of a size of the first opening to a size of the first light on the first emission portion, and
an angle defining a numerical aperture of the first lens optical system is greater than an angle formed on the first emission portion by two outermost beams of the first light passing through the second opening in the at least one shield.

16. The illumination apparatus according to claim 15, wherein
the at least one shield includes a surface defining the second opening, and the surface is inclined toward an optical axis of the first light at a smaller distance from the first lens optical system.

17. The illumination apparatus according to claim 15, wherein
the at least one shield includes a surface defining the second opening, and the surface is inclined away from an optical axis of the first light at a smaller distance from the first lens optical system.

18. An illumination apparatus comprising:
a housing including a first opening;
a first light source including a first emission portion to emit first light into an internal space of the housing;
a first lens optical system including at least one first lens between the first emission portion and the first opening in the housing on a path of the first light, the first lens optical system being configured to form an image of the first light from the first emission portion on an imaginary image plane adjacent to the first opening and configured to cause the first light to be emitted through the first opening;
a light reducer configured to reflect or scatter reflection-scattering light entering the internal space of the housing toward the first light source, the reflection-scattering light being the first light reflected or scattered, the light reducer is located on an inner wall of the housing; and
at least one shield located on the path of the first light and including a second opening to allow passage of the first light,
wherein:
the first light is partially incident on the at least one shield, and
two outermost beams of the first light on the first emission portion form a smaller angle after passing through the second opening in the at least one shield than before passing through the second opening.

* * * * *